United States Patent
Sarkis et al.

(10) Patent No.: US 12,063,623 B2
(45) Date of Patent: Aug. 13, 2024

(54) MULTI-LAYER CONTROL IN NEW RADIO SIDELINK

(71) Applicant: QUALCOMM Incorporated, San Diego, CA (US)

(72) Inventors: Gabi Sarkis, San Diego, CA (US); Wanshi Chen, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/153,697

(22) Filed: Jan. 20, 2021

(65) Prior Publication Data
US 2021/0227505 A1 Jul. 22, 2021

Related U.S. Application Data

(60) Provisional application No. 62/963,661, filed on Jan. 21, 2020.

(51) Int. Cl.
H04W 72/02 (2009.01)
H04B 7/0456 (2017.01)
(Continued)

(52) U.S. Cl.
CPC .......... *H04W 72/02* (2013.01); *H04B 7/0456* (2013.01); *H04W 72/1263* (2013.01); *H04W 72/20* (2023.01)

(58) Field of Classification Search
CPC . H04W 72/02; H04W 72/20; H04W 72/1263; H04B 7/0456
See application file for complete search history.

(56) References Cited

U.S. PATENT DOCUMENTS

2020/0236667 A1* 7/2020 Kwak .................... H04W 4/40
2020/0336253 A1* 10/2020 He ......................... H04L 1/1887
(Continued)

FOREIGN PATENT DOCUMENTS

WO WO-2018038978 A1 3/2018
WO WO-2019140076 A1 7/2019
(Continued)

OTHER PUBLICATIONS

Apple: "On NR V2X Physical Layer Structure", 3GPP TSG RAN WG1 #99, 3GPP Draft; R1-1912810, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, Nov. 9, 2019 (Nov. 9, 2019), pp. 1-15, XP051823610, Retrieved from the Internet: URL: https://ftp.3gpp.org/tsg_ran/WG1_RL1/TSGR1_99/Docs/R1-1912810. zip R1-1912810 On NR V2X Physical Layer Structure.docx [retrieved on Nov. 9, 2019] Sections 2.1-2.6, section 2.7.

(Continued)

*Primary Examiner* — Won Tae C Kim
(74) *Attorney, Agent, or Firm* — Holland & Hart LLP

(57) ABSTRACT

Methods, systems, and devices for wireless communications are described. Wireless communications systems may support both access links and sidelinks (e.g., D2D communication links) for communications between one or more communication devices. Wireless devices may communicate sidelink control information in two stages, where first stage sidelink control information (SCI-1) may be transmitted via a physical sidelink channel and second stage sidelink control information (SCI-2) may be transmitted via a physical shared channel. In cases where sidelink communications use several (e.g., three or more) layers, the described layer mapping techniques may provide for robust transmission of control information, higher data rates, improved spectral (Continued)

efficiency, etc. For example, SCI-1 and/or SCI-2 may be mapped to physical channel layers by repeating the same modulation symbols across all layers, across groupings or sets of layers, across layers associated with each codeword, etc.

26 Claims, 13 Drawing Sheets

(51) Int. Cl.
*H04W 72/1263* (2023.01)
*H04W 72/20* (2023.01)

(56) References Cited

U.S. PATENT DOCUMENTS

| | | | |
|---|---|---|---|
| 2021/0211219 A1* | 7/2021 | Sarkis | H04L 1/0007 |
| 2022/0007378 A1* | 1/2022 | Basu Mallick | H04L 5/001 |
| 2022/0174655 A1* | 6/2022 | Tsai | H04W 4/40 |
| 2022/0232549 A1* | 7/2022 | Yeo | H04L 1/0028 |
| 2022/0272727 A1* | 8/2022 | Salim | H04L 5/0053 |
| 2022/0303059 A1* | 9/2022 | Hahn | H04L 1/1812 |

FOREIGN PATENT DOCUMENTS

| | | | | |
|---|---|---|---|---|
| WO | WO-2019153147 A1 | | 8/2019 | |
| WO | WO-2021071411 A1 | * | 4/2021 | |
| WO | WO-2021087857 A1 | * | 5/2021 | H04L 1/0041 |

OTHER PUBLICATIONS

Huawei, et al., "Sidelink Physical Layer Structure for NR V2X", 3GPP Draft, 3GPP TSG RAN WG1 Meeting #99, R1-1911882, 3rd Generation Partnership Project (3GPP), Mobile Competence Centre, 650, Route Des Lucioles, F-06921 Sophia-Antipolis Cedex, France, vol. RAN WG1, No. Reno. USA, Nov. 18, 2019-Nov. 22, 2019, Nov. 9, 2019 (Nov. 9, 2019), XP051823064, 35 Pages, Retrieved from the Internet: URL: https://ftp.3gpp.org/tsg_ran/WG1_RL1/TSGR1_99/Docs/R1-1911882.zip. R1-1911882.docx. [Retrieved on Nov. 9, 2019]. section 4.
International Search Report and Written Opinion—PCT/US2021/014363—ISA/EPO—Apr. 23, 2021.

* cited by examiner

| Layer 0 | C-M0 | C-M1 | C-M2 | D-M0 | D-M1 | D-M2 |
| Layer 1 | C-M0 | C-M1 | C-M2 | D-M3 | D-M4 | D-M5 |

FIG. 3A — 300

| | Layer | | | | | | |
|---|---|---|---|---|---|---|---|
| 305-a | Layer 0 | C-M0 | C-M1 | C-M2 | D-M0 | D-M1 | D-M2 |
| | Layer 1 | C-M0 | C-M1 | C-M2 | D-M3 | D-M4 | D-M5 |
| 305-b | Layer 2 | C-M0' | C-M1' | C-M2' | D-M0' | D-M1' | D-M2' |
| | Layer 3 | C-M0' | C-M1' | C-M2' | D-M3' | D-M4' | D-M5' |

FIG. 3B — 301

| | Layer | | | | | | |
|---|---|---|---|---|---|---|---|
| 305-c | Layer 0 | C-M0 | C-M1 | C-M2 | D-M0 | D-M1 | D-M2 |
| | Layer 1 | C-M0 | C-M1 | C-M2 | D-M3 | D-M4 | D-M5 |
| | Layer 2 | C-M0' | C-M1' | C-M2' | D-M6 | D-M7 | D-M8 |
| 305-d | Layer 3 | C-M0' | C-M1' | C-M2' | D-M0' | D-M1' | D-M2' |

FIG. 3C — 302

MULTI-LAYER CONTROL IN NEW RADIO SIDELINK

CROSS REFERENCE

The present Application for Patent claims the benefit of U.S. Provisional Patent Application No. 62/963,661 by Sarkis et al., entitled "MULTI-LAYER CONTROL IN NEW RADIO SIDELINK," filed Jan. 21, 2020, assigned to the assignee hereof, and expressly incorporated by reference herein.

BACKGROUND

The following relates generally to wireless communications, and more specifically to multi-layer control in New Radio (NR) sidelink.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link may refer to a communication link between a UE and a base station. In some examples, an access link may be referred to as a Uu interface. Specifically, the Uu interface may refer to an over-the-air interface for downlink transmissions, uplink transmissions, or both. A sidelink may refer to a communication link (e.g., a device-to-device link) between similar devices. For example, a sidelink may support communications between multiple UEs (e.g., in a vehicle-to-everything (V2X) system, a vehicle-to-vehicle (V2V) system, a device-to-device (D2D) system, among other examples). In some examples, a sidelink may support unicast messaging, groupcast messaging, multicast messaging, broadcast messaging, or combinations thereof. In such systems, techniques for reliable communication may be desirable.

SUMMARY

The described techniques relate to improved methods, systems, devices, and apparatuses that support multi-layer control in New Radio (NR) sidelink. Generally, the described techniques provide for efficient and reliable communication of control information (e.g., sidelink control information (SCI)) and data information. For example, in some cases, devices (e.g., user equipment (UEs)) may communicate sidelink control information in two stages, where first stage sidelink control information (SCI-1) may be transmitted via a physical sidelink control channel (PSCCH) and second stage sidelink control information (SCI-2) may be transmitted via a physical sidelink shared channel (PSSCH). In cases where sidelink communications (e.g., PSCCH, PSSCH) use several (e.g., three or more) multiple input multiple output (MIMO) layers, the described layer mapping techniques may provide for robust transmission of control information, higher data rates, improved spectral efficiency, etc.

A method of wireless communication at a transmitting UE is described. The method may include determining sidelink control information for sidelink communications, the sidelink control information including first stage sidelink control information for transmission in a sidelink control channel and second stage sidelink control information for transmission in a sidelink shared channel. The method may further include identifying that the sidelink shared channel is mapped to at least three layers, mapping the sidelink control information based on the sidelink shared channel being mapped to the at least three layers, and transmitting the sidelink control information based on the mapping.

An apparatus for wireless communication at a transmitting UE is described. The apparatus may include a processor, memory coupled with the processor, and instructions stored in the memory. The instructions may be executable by the processor to cause the apparatus to determine sidelink control information for sidelink communications, the sidelink control information including first stage sidelink control information for transmission in a sidelink control channel and second stage sidelink control information for transmission in a sidelink shared channel. The instructions may be executable by the processor to further cause the apparatus to identify that the sidelink shared channel is mapped to at least three layers, map the sidelink control information based on the sidelink shared channel being mapped to the at least three layers, and transmit the sidelink control information based on the mapping.

Another apparatus for wireless communication at a transmitting UE is described. The apparatus may include means for determining sidelink control information for sidelink communications, the sidelink control information including first stage sidelink control information for transmission in a sidelink control channel and second stage sidelink control information for transmission in a sidelink shared channel, identifying that the sidelink shared channel is mapped to at least three layers, mapping the sidelink control information based on the sidelink shared channel being mapped to the at least three layers, and transmitting the sidelink control information based on the mapping.

A non-transitory computer-readable medium storing code for wireless communication at a transmitting UE is described. The code may include instructions executable by a processor to determine sidelink control information for sidelink communications, the sidelink control information including first stage sidelink control information for transmission in a sidelink control channel and second stage sidelink control information for transmission in a sidelink shared channel, identify that the sidelink shared channel is mapped to at least three layers, map the sidelink control information based on the sidelink shared channel being mapped to the at least three layers, and transmit the sidelink control information based on the mapping.

Some examples of the method, apparatuses, and non-transitory computer-readable medium described herein may further include operations, features, means, or instructions for identifying a first set of one or more layers of the at least three layers of the sidelink shared channel for transmission of a first data codeword, and identifying a second set of one or more layers of the at least three layers of the sidelink shared channel for transmission of a second data codeword, where the second stage sidelink control information includes a first portion associated with the first data codeword and a second portion associated with the second data codeword. In some examples of the method, apparatuses, and non-transitory computer-readable medium described herein, mapping the sidelink control information may include operations, features, means, or instructions for repeating the first portion of the second stage sidelink control information across the first set of one or more layers for transmission of the first data codeword, and repeating the second portion of the second stage sidelink control information across the second set of one or more layers for transmission of the second data codeword.

Some examples of the method, apparatuses, and non-transitory computer-readable medium described herein may further include operations, features, means, or instructions for identifying a layer repetition level, and identifying one or more sets of layers of the at least three layers of the sidelink shared channel based on the layer repetition level, where the sidelink control information may be mapped based on the one or more sets of layers. In some examples of the method, apparatuses, and non-transitory computer-readable medium described herein, mapping the sidelink control information may include operations, features, means, or instructions for repeating a first portion of the second stage sidelink control information across a first set of the one or more sets of layers, and repeating a second portion of the second stage sidelink control information across a second set of the one or more sets of layers. In some examples of the method, apparatuses, and non-transitory computer-readable medium described herein, a first set of the one or more sets of layers may be associated with two different data codewords.

In some examples of the method, apparatuses, and non-transitory computer-readable medium described herein, mapping the sidelink control information may include operations, features, means, or instructions for repeating the second stage sidelink control information across each layer of the at least three layers.

Some examples of the method, apparatuses, and non-transitory computer-readable medium described herein may further include operations, features, means, or instructions for receiving a radio resource control parameter, and identifying a layer mapping configuration based on the radio resource control parameter, where the second stage sidelink control information may be mapped to the at least three layers based on the layer mapping configuration. In some examples of the method, apparatuses, and non-transitory computer-readable medium described herein, the layer mapping configuration may be identified per system, per resource pool, or both.

Some examples of the method, apparatuses, and non-transitory computer-readable medium described herein may further include operations, features, means, or instructions for identifying a layer mapping configuration, and transmitting an indication of the layer mapping configuration in the first stage sidelink control information, where the second stage sidelink control information may be mapped to the at least three layers based on the layer mapping configuration. Some examples of the method, apparatuses, and non-transitory computer-readable medium described herein may further include operations, features, means, or instructions for identifying an effective code rate for the second stage sidelink control information, and identifying a layer mapping configuration based on the effective code rate, where the second stage sidelink control information may be mapped to the at least three layers based on the layer mapping configuration.

Some examples of the method, apparatuses, and non-transitory computer-readable medium described herein may further include operations, features, means, or instructions for identifying a target code rate for the second stage sidelink control information, and identifying a layer mapping configuration based on the target code rate, where the second stage sidelink control information may be mapped to the at least three layers based on the layer mapping configuration.

Some examples of the method, apparatuses, and non-transitory computer-readable medium described herein may further include operations, features, means, or instructions for identifying a number of layers associated with the sidelink shared channel, and identifying a layer mapping configuration based on the number of layers associated with the sidelink shared channel, where the second stage sidelink control information may be mapped to the at least three layers associated with the sidelink shared channel based on the layer mapping configuration. In some examples of the method, apparatuses, and non-transitory computer-readable medium described herein, identifying the layer mapping configuration may include operations, features, means, or instructions for identifying which layers of the at least three layers may be used for repetition of the second stage sidelink control information. In some examples of the method, apparatuses, and non-transitory computer-readable medium described herein, the number of layers, the layer mapping configuration, or both, may be identified based on an effective code rate threshold associated with the second stage sidelink control information.

In some examples of the method, apparatuses, and non-transitory computer-readable medium described herein, mapping the sidelink control information may include operations, features, means, or instructions for repeating the first stage sidelink control information across two layers of the sidelink control channel. In some examples of the method, apparatuses, and non-transitory computer-readable medium described herein, mapping the sidelink control information may include operations, features, means, or instructions for mapping the first stage sidelink control information as a single layer of the sidelink control channel.

In some examples of the method, apparatuses, and non-transitory computer-readable medium described herein, mapping the sidelink control information may include operations, features, means, or instructions for mapping the first stage sidelink control information as a single layer for each codeword of the sidelink control channel.

In some examples of the method, apparatuses, and non-transitory computer-readable medium described herein, mapping the sidelink control information may include operations, features, means, or instructions for mapping the first stage sidelink control information as a single layer for each codeword of the sidelink shared channel.

Some examples of the method, apparatuses, and non-transitory computer-readable medium described herein may further include operations, features, means, or instructions for identifying a layer mapping configuration per system, per resource pool, or both, where the first stage sidelink control information may be mapped to the sidelink control channel based on the layer mapping configuration.

A method of wireless communication at a receiving UE is described. The method may include identifying a layer mapping configuration based on a sidelink shared channel being mapped to at least three layers, receiving sidelink control information for sidelink communications, the sidelink control information including first stage sidelink control information in a sidelink control channel and second stage sidelink control information in the sidelink shared channel, and decoding the sidelink control information based on the layer mapping configuration.

An apparatus for wireless communication at a receiving UE is described. The apparatus may include a processor, memory coupled with the processor, and instructions stored in the memory. The instructions may be executable by the processor to cause the apparatus to identify a layer mapping configuration based on a sidelink shared channel being mapped to at least three layers, receive sidelink control information for sidelink communications, the sidelink control information including first stage sidelink control information in a sidelink control channel and second stage sidelink control information in the sidelink shared channel, and decode the sidelink control information based on the layer mapping configuration.

Another apparatus for wireless communication at a receiving UE is described. The apparatus may include means for identifying a layer mapping configuration based on a sidelink shared channel being mapped to at least three layers, receiving sidelink control information for sidelink communications, the sidelink control information including first stage sidelink control information in a sidelink control channel and second stage sidelink control information in the sidelink shared channel, and decoding the sidelink control information based on the layer mapping configuration.

A non-transitory computer-readable medium storing code for wireless communication at a receiving UE is described. The code may include instructions executable by a processor to identify a layer mapping configuration based on a sidelink shared channel being mapped to at least three layers, receive sidelink control information for sidelink communications, the sidelink control information including first stage sidelink control information in a sidelink control channel and second stage sidelink control information in the sidelink shared channel, and decode the sidelink control information based on the layer mapping configuration.

In some examples of the method, apparatuses, and non-transitory computer-readable medium described herein, identifying the layer mapping configuration may include operations, features, means, or instructions for identifying a first set of one or more layers of the at least three layers of the sidelink shared channel for reception of a first data codeword, and identifying a second set of one or more layers of the at least three layers of the sidelink shared channel for reception of a second data codeword, where the second stage sidelink control information includes a first portion associated with the first data codeword and a second portion associated with the second data codeword.

In some examples of the method, apparatuses, and non-transitory computer-readable medium described herein, decoding the sidelink control information may include operations, features, means, or instructions for decoding repetition of the first portion of the second stage sidelink control information across the first set of one or more layers for reception of the first data codeword, and decoding repetition of the second portion of the second stage sidelink control information across the second set of one or more layers for reception of the second data codeword. In some examples of the method, apparatuses, and non-transitory computer-readable medium described herein, identifying the layer mapping configuration may include operations, features, means, or instructions for identifying a layer repetition level, and identifying one or more sets of layers of the at least three layers of the sidelink shared channel based on the layer repetition level, where the sidelink control information may be decoded based on the one or more sets of layers.

In some examples of the method, apparatuses, and non-transitory computer-readable medium described herein, decoding the sidelink control information may include operations, features, means, or instructions for decoding repetitions of a first portion of the second stage sidelink control information across a first set of the one or more sets of layers, and decoding repetitions of a second portion of the second stage sidelink control information across a second set of the one or more sets of layers. In some examples of the method, apparatuses, and non-transitory computer-readable medium described herein, a first set of the one or more sets of layers may be associated with two different data codewords.

In some examples of the method, apparatuses, and non-transitory computer-readable medium described herein, decoding the sidelink control information may include operations, features, means, or instructions for decoding repetitions of the second stage sidelink control information across each layer of the at least three layers. Some examples of the method, apparatuses, and non-transitory computer-readable medium described herein may further include operations, features, means, or instructions for receiving a radio resource control parameter, where the layer mapping configuration may be identified based on the radio resource control parameter.

In some examples of the method, apparatuses, and non-transitory computer-readable medium described herein, the layer mapping configuration may be identified per system, per resource pool, or both. Some examples of the method, apparatuses, and non-transitory computer-readable medium described herein may further include operations, features, means, or instructions for receiving an indication of the layer mapping configuration in the first stage sidelink control information, where the layer mapping configuration may be identified based on the indication. Some examples of the method, apparatuses, and non-transitory computer-readable medium described herein may further include operations, features, means, or instructions for identifying an effective code rate for the second stage sidelink control information, where the layer mapping configuration may be identified based on the effective code rate.

Some examples of the method, apparatuses, and non-transitory computer-readable medium described herein may further include operations, features, means, or instructions for identifying a target code rate for the second stage sidelink control information, where the layer mapping configuration may be identified based on the target code rate. Some examples of the method, apparatuses, and non-transitory computer-readable medium described herein may further include operations, features, means, or instructions for identifying a number of layers associated with the sidelink shared channel, where the layer mapping configuration may be identified based on the number of layers associated with the sidelink shared channel. In some examples of the method, apparatuses, and non-transitory computer-readable medium described herein, the number of layers, the layer mapping configuration, or both, may be identified based on an effective code rate threshold associated with the second stage sidelink control information.

In some examples of the method, apparatuses, and non-transitory computer-readable medium described herein, identifying the layer mapping configuration may include operations, features, means, or instructions for identifying which layers of the at least three layers may be used for repetition of the second stage sidelink control information. In some examples of the method, apparatuses, and non-transitory computer-readable medium described herein, the first stage sidelink control information may be repeated across two layers of the sidelink control channel. In some examples of the method, apparatuses, and non-transitory computer-readable medium described herein, the first stage sidelink control information may be mapped to each layer of the sidelink control channel. In some examples of the method, apparatuses, and non-transitory computer-readable medium described herein, the first stage sidelink control information may be mapped as a single layer for each codeword of the sidelink control channel. In some examples of the method, apparatuses, and non-transitory computer-readable medium described herein, the first stage sidelink control information may be mapped as a single layer for each codeword of the sidelink shared channel.

BRIEF DESCRIPTION OF THE DRAWINGS

FIGS. 3A, 3B, and 3C illustrate example layer mapping configurations that support multi-layer control in accordance with aspects of the present disclosure.

DETAILED DESCRIPTION

Figure 1:
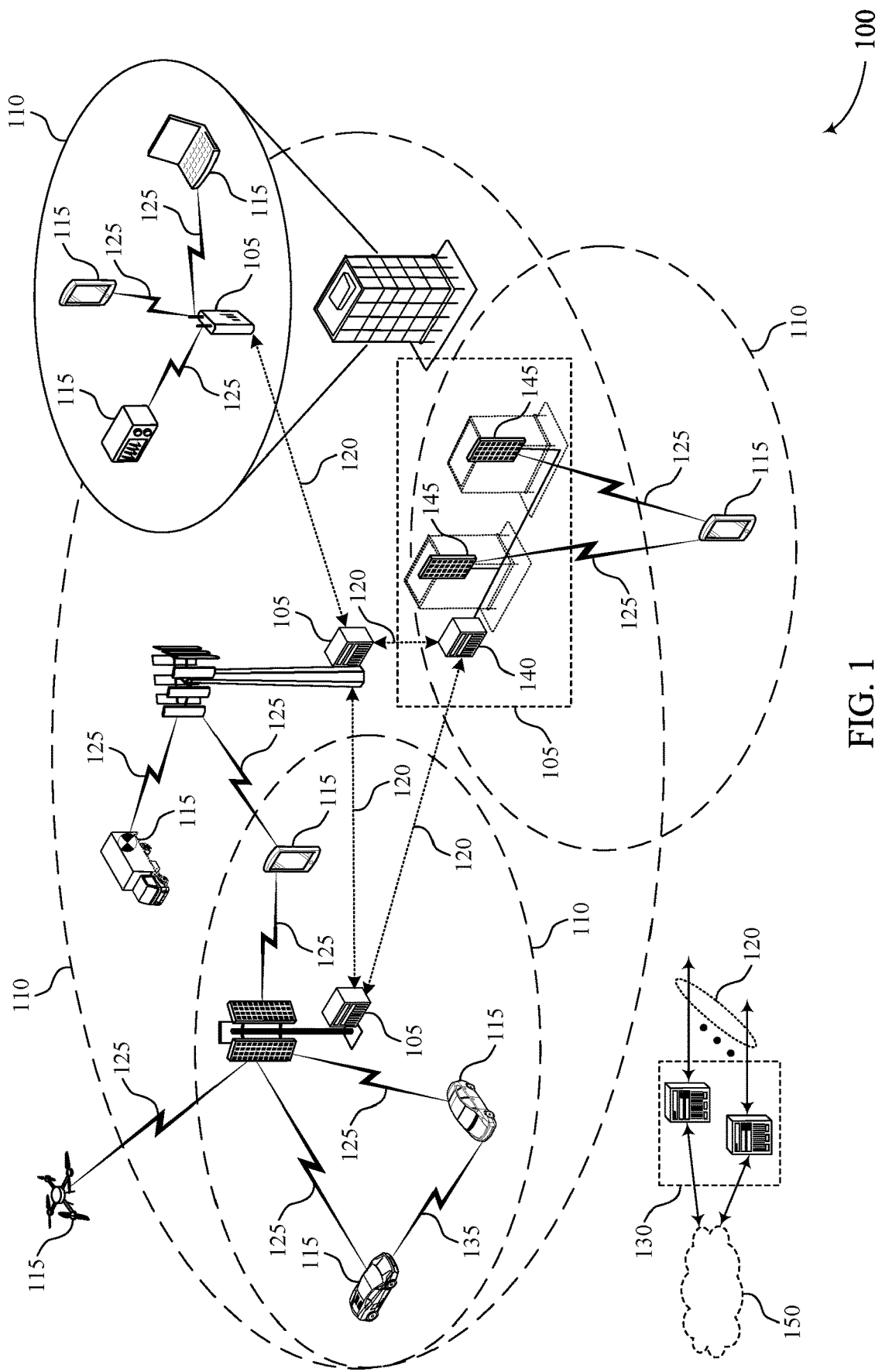
FIG. 1 illustrates an example of a system for wireless communications that supports multi-layer control in New Radio (NR) sidelink in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, a backhaul communication link between base stations, etc.). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

In some examples, sidelink communications may support communications between UEs. For example, a UE may have information to transmit to one or more other UEs (e.g., such as a detection of an object or obstacle on a road in a V2X system, scheduling information, etc.) and the UE may initiate a sidelink communication including the information to the other UEs. The other UEs may monitor sidelink resource pools for the sidelink communications. In some examples, sidelink control information (SCI) may be transmitted in two stages. For example, sidelink resource allocation may be reservation based, and first stage control information (SCI-1) may be sent over a physical sidelink control channel (PSCCH) to reserve resources for a transmitting UE. Second stage control information (SCI-2) may be sent over a physical sidelink shared channel (PSSCH), and may include control information for decoding the PSSCH (e.g., control information for decoding data information of the PSSCH).

Further, in some cases, sidelink information (e.g., SCI, sidelink data information, etc.) may be communicated in the form of codewords. Codewords may refer to separate streams of data that include the information to be sent through a physical channel (e.g., such as through PSCCH, PSSCH). For example, a transmitting UE may perform a modulation process and place sidelink information (e.g., SCI, sidelink data) that is to be transmitted through a particular channel into the codewords for that channel. Once a physical channel's codewords have been scrambled and modulated, the codewords may be mapped onto one or more layers (e.g., there may be up to as many layers as there are antenna ports). Codeword-to-layer mapping may thus split the sidelink information into one or more layers associated with the PSCCH and/or PSSCH. In some examples, SCI-1 may be transmitted over PSCCH using a single layer, and SCI-2 and sidelink data may be transmitted over PSSCH using one or two layers. However, as wireless communications systems and wireless devices are designed with expanded antenna arrays, higher carrier frequencies, etc., additional layers may be employed for communications. It may be desirable to support additional (e.g., an increased number) of layers for sidelink communications to improve reliability of sidelink communications, increase throughput of sidelink communications, etc.

The described techniques may provide for efficient layer mapping of sidelink communications (e.g., in cases where PSCCH and/or PSSCH use several, such as three or more multiple input multiple output (MIMO) layers). The described layer mapping techniques may provide for robust transmission of control information, higher data rates, improved spectral efficiency, etc. For example, SCI-1 and/or SCI-2 may be mapped to physical channel layers by repeating the same modulation symbols across all layers, across groupings or sets of layers, etc. according to the various examples (e.g., according to various layer mapping configurations) described herein. In some cases, layer mapping configurations described herein may provide for improved SCI robustness, improved SCI throughput, improved sidelink data throughput, etc. UEs may, as a result, include features for improvements to power consumption, spectral efficiency, higher data rates and, in some examples, may promote enhanced efficiency for sidelink communications.

Aspects of the disclosure are initially described in the context of a wireless communications system. Example layer mapping configurations and an example process flow illustrating aspects of the discussed techniques are then described. Aspects of the disclosure are further illustrated by and described with reference to apparatus diagrams, system diagrams, and flowcharts that relate to multi-layer control (e.g., in NR sidelink).

FIG. 1 illustrates an example of a wireless communications system 100 that supports multi-layer control (e.g., in NR sidelink) in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some cases, in wireless communications system 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support both access links (e.g., communication links 125) and sidelinks (e.g., D2D communication links 135) for communications between one or more communication devices. Wireless devices (e.g., UEs 115) may communicate sidelink control information in two stages, where first stage sidelink control information (SCI-1) may be transmitted via PSCCH and second stage sidelink control information (SCI-2) may be transmitted via a PSSCH. In cases where sidelink communications (e.g., PSCCH, PSSCH) use several (e.g., three or more) MIMO layers, the described layer mapping techniques may provide for robust transmission of control information, higher data rates, improved spectral efficiency, etc. For example, SCI-1 and/or SCI-2 may be mapped to physical channel layers (e.g., MIMO layers associated with PSCCH, MIMO layers associated with PSSCH) by repeating the same modulation symbols across all layers, across groupings or sets of layers, across layers associated with each MIMO codeword, etc.

Figure 2:
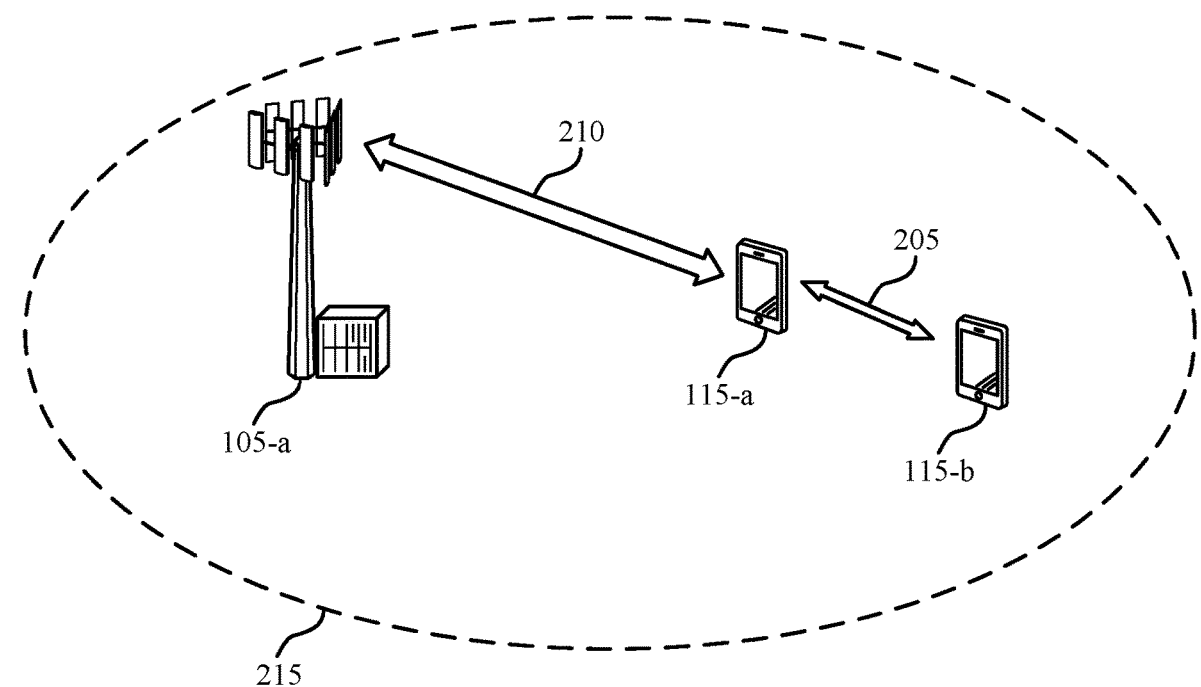
FIG. 2 illustrates an example of a wireless communications system that supports multi-layer control in accordance with aspects of the present disclosure.

FIG. 2 illustrates an example of a wireless communications system 200 that supports multi-layer control in accordance with aspects of the present disclosure. In some examples, wireless communications system 200 may implement aspects of wireless communications system 100. The wireless communications system 200 may include at least base station 105-a, UE 115-a, and UE 115-b. In some examples, base station 105-a may be an example of a base station 105, and UE 115-a and UE 115-b may be examples of UEs 115, as described with reference to FIG. 1. UE 115-a and UE 115-b may communicate with each other (e.g., within a V2X system, a D2D system, etc.) and may employ sidelink transmissions to save power, ensure reliable communications, etc.

The wireless communications system 200 may support both access links 210 and sidelinks 205 for communications between one or more communication devices. An access link 210 may refer to a communication link between a UE 115 (such as, UE 115-a and UE 115-b) and a base station 105-a. A sidelink 205 (e.g., a D2D communication link) may refer to any communication link between similar wireless devices (e.g., a communication link between UEs 115, a backhaul communication link between base stations 105, or the like). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE 115 to one or more other UEs 115.

As depicted in the example of FIG. 2, UE 115-*a* and UE 115-*b* may communicate with each other (or with another group of UEs 115) over sidelink 205 communications (e.g., using a P2P or D2D protocol). In some cases, UE 115-*a* may be referred to as a transmitting UE and UE 115-*b* may be referred to as a receiving UE. In some cases, UE 115-*a* may transmit sidelink transmissions (e.g., which may include SCI, data information, etc.) to UE 115-*b*. In some examples, UE 115-*a* or UE 115-*b* may monitor resource pools for the sidelink communications or for indications of the sidelink communications (e.g., resource reservations, control channel transmissions, among other examples) from other UEs 115. Additionally or alternatively, the UEs 115 may have data to transmit to (or receive from) one or more of the UEs 115, and the UEs 115 may use sidelink 205 communications to transmit the data transmission. As discussed herein, UEs 115 may utilize sidelinks 205 (e.g., the sidelink communications between UEs 115) in addition to access links 210 with the base station 105.

In some cases, a UE 115 (e.g., UE 115-*a*) may have information (e.g., resource reservations, a detection of an object or obstacle on a road in a V2X system, scheduling information, among other examples) to transmit to one or more other UEs 115 (e.g., UE 115-*b*), and the UE 115 may initiate a sidelink communications including the information to the one or more other UEs 115. In such cases, the UE 115 initiating the sidelink communications (e.g., UE 115-*a*) may be referred to as a transmitting UE and the UE 115 receiving the sidelink communications (e.g., UE 115-*b*) may be referred to as a receiving UE. For example, UE 115-*b* may monitor sidelink resource pools for sidelink communications that may be received from UE 115-*a*.

As discussed herein, SCI may include a two-stage control, where decoding information for the second stage of the sidelink control information (e.g., SCI-2) is included in the first stage of the sidelink control information (e.g., in SCI-1). For example, sidelink resource allocation may be reservation-based, and a transmitting UE (e.g., UE 115-*a*) may transmit SCI-1 (e.g., a first transmission) to reserve resources for itself (e.g., resources for transmission of PSSCH, retransmissions, other transmissions in the future, etc.). Such a reservation (e.g., SCI-1) may be formatted or configured for all or most UEs 115 within the wireless communications system to be able to decode (e.g., as there may be no central controller for sidelink communications). As such, SCI-1 may help UEs 115 (e.g., such as UEs 115 belonging to different releases or UEs of different capabilities) avoid or refrain from using each other's resources (e.g., even if other UEs 115 cannot decode subsequent transmissions, such as SCI-2). SCI-2 may include information for decoding data of a sidelink transmission (e.g., such as destination ID, source ID, etc.). Generally, SCI-1 may be sent over PSCCH to reserve resources for sidelink communications, and SCI-2 may be sent over PSSCH and may include control information for data (e.g., PSSCH) decoding.

In some examples, SCI-1 may be sent over PSCCH using a single layer (e.g., rank-1) and SCI-2 may be sent over PSSCH using a same number of layers as the shared channel (e.g., SCI-2 may follow the demodulation reference signal (DMRS) of data and may be sent using a number of layers associated with the PSSCH, such as one or two layers). In some cases, when PSSCH uses two layers, SCI-2 may be mapped to the two layers by repeating the same modulation symbols (e.g., SCI-2 modulation symbols) across both layers (e.g., for improved SCI-2 performance/robustness).

However, in some cases, sidelink communications may employ additional layers (e.g., PSSCH may be mapped to three or more layers) for further improvements in data throughput, sidelink reliability, etc. Further, in some cases, sidelink communications may employ one or two transport blocks (TBs) or codewords per sidelink transmission. The techniques described herein may provide for efficient control mapping for sidelink communications using such increased MIMO layers, for sidelink communications employing additional TBs or codewords per sidelink transmission (e.g., for sidelink communications where PSSCH is for two or more MIMO codewords), etc. For example, the techniques described herein may provide for layer mapping configurations (e.g., for scrambling and modulation of bits dependent on the number of layers, which locations or modulation symbols are copied in layer mapping, etc.) that may improve SCI robustness, improve SCI throughput, improve sidelink data throughput, etc.

For example, when PSSCH is transmitted over more than two layers, SCI-2 may be repeated across all layers (e.g., SCI-2 may be carried on resources of the PSSCH and may be repeated across each layer associated with PSSCH). In some examples, if PSSCH is for more than two MIMO codewords, SCI-2 may be repeated across the layers of each MIMO layer associated with the codeword. For instance, if a first codeword (CW-0) is on layers 0 and 1, and a second codeword (CW-1) is on layer 2, then SCI-2 for CW-0 may be repeated on layers 0 and 1, and SCI-2 for CW-1 may be mapped to layer 2. In some examples, PSSCH may be repeated over a number of layers independently of whether those layers belong to the same MIMO codeword or not. For instance, such a layer mapping configuration may be associated with a repetition level (e.g., a number of layers of which SCI-2 is repeated across), where SCI-2 is repeated across the number of layers (e.g., across sets of layers corresponding to the repetition level, regardless of whether or not a given set of layers belong to a single codeword or to different, or more than one, codewords).

In some cases, implementation of one or more of the layer mapping configurations described herein may be configured (e.g., preconfigured) systemwide or per resource pool. In some examples, a layer mapping configuration may be semi-statically configured within a sidelink system (e.g., via a RRC parameter). In some examples, a layer mapping configuration may be signaled in SCI-1. For instance, SCI-1 may indicate (e.g., via one or more reserved bits in SCI-1) how many layers are associated with PSSCH, how SCI-2 is mapped to the PSSCH layers, etc. In some examples, a layer mapping configuration may be determined implicitly based on effective code rate for SCI-2. For instance, a UE 115 may calculate an SCI-2 payload size, divide by available resources, and determine a layer mapping configuration based on the effective code rate for SCI-2. In some examples, a layer mapping configuration may be determined implicitly based on target code rate for SCI-2 (e.g., from a modulation coding scheme (MCS) and beta offset in SCI-1).

In some cases, a layer mapping configuration may be determined or configured based on a condition of keeping the effective code rate below some threshold (e.g., below an effective code rate threshold) by controlling the number of layers and mapping used for SCI-2 (e.g., to maintain some target spectral efficiency). SCI-2 may have different formats with different payload sizes and layer mapping configuration may be determined or configured based on the target effective code rate maintained for all control. In some cases, an RRC parameter may configure how layer mapping configurations are determined (e.g., an RRC parameter may configure which of the alternatives above may be used by UEs 115 to determine layer mapping configurations).

Additionally or alternatively, techniques described herein may be applicable to SCI-1. In some examples (e.g., when PSSCH is mapped to more than two layers), PSCCH may be repeated for every two layers of PSSCH (e.g., PSCCH may be repeated every two codewords). In some examples, PSCCH may be mapped as a single layer for each PSCCH or PSSCH MIMO codeword. In some examples, PSCCH may be mapped as a single layer. The selection between the alternative discussed above (e.g., the layer mapping configuration for SCI-1) may be configured (e.g., preconfigured) per system (e.g., per sidelink system, such as per V2X system, per D2D system, etc.) or per resource pool.

FIGS. 3A, 3B, and 3C illustrate example layer mapping configurations 300, 301, and 302, respectively, that each support multi-layer control in accordance with aspects of the present disclosure. In some examples, layer mapping configurations 300, 301, and 302 may implement aspects of wireless communications system 100 and/or wireless communications system 200. For example, a UE 115 (e.g., a transmitting UE 115) may map SCI (e.g., SCI-2) in accordance with one or more aspects of layer mapping configuration 300, layer mapping configuration 301, and/or layer mapping configuration 302. Further, a UE 115 (e.g., a receiving UE 115) may decode SCI (e.g., SCI-2) in accordance with one or more aspects of layer mapping configuration 300, layer mapping configuration 301, and/or layer mapping configuration 302.

In some cases, one or more aspects of layer mapping configuration 300, layer mapping configuration 301, and layer mapping configuration 302 may be combined for other layer mapping configurations. Further, layer mapping configuration 300, layer mapping configuration 301, and layer mapping configuration 302 are shown for illustrative purposes, other layer mapping configurations with more or less symbols, more or less layers, etc. may be implemented by analogy based on the techniques described herein, without departing from the scope of the present disclosure. As discussed herein, layer mapping configuration 300, layer mapping configuration 301, layer mapping configuration 302, and/or other layer mapping configurations may be configured or implemented based on RRC parameters, SCI-1 signaling, effective code rate for SCI-2, target code rate for SCI-2, etc.

Layer mapping configuration 300 may illustrate a layer mapping configuration where SCI may be repeated across all layers. For example, layer mapping configuration 300 may illustrate two layers (e.g., Layer 0 and Layer 1) associated with a PSSCH, with three control modulation symbols (C-M0, C-M1, and C-M2) repeated across the two layers and data modulation symbols (D-M0, D-M1, D-M2, D-M3, D-M4, and D-M5) extended across the two layers. That is, in layer mapping configuration 300, C-M0, C-M1, and C-M2 may be mapped to Layer 0 and the same C-M0, C-M1, and C-M2 may be mapped to Layer 1 (e.g., C-M0, C-M1, and C-M2 may be repeated across Layer 0 and Layer 1). Further, D-M0, D-M1, D-M2 may be mapped to Layer 0 and additional or subsequent D-M3, D-M4, and D-M5 may be mapped to Layer 1 (e.g., D-M0, D-M1, D-M2, D-M3, D-M4, and D-M5 may be extended across the two layers Layer 0 and Layer 1). Such may provide for improved robustness and reliability of control information (C-M0, C-M1, and C-M2) as well as improved throughput of data information (D-M0, D-M1, D-M2, D-M3, D-M4, and D-M5).

Layer mapping configuration 301 may illustrate a layer mapping configuration where, if PSSCH is for more than two MIMO codewords, SCI may be repeated across the layers of each MIMO codeword. For example, layer mapping configuration 301 may illustrate TBs 305-a and 305-b (e.g., where a TB may refer to a codeword-to-layer mapping, where a TB size may be based on a number of physical resource blocks and the MCS). For instance, a first codeword may be mapped to layers of TB 305-a (e.g., Layer 0 and Layer 1) and a second codeword may be mapped to layers of TB 305-b (e.g., Layer 2 and Layer 3). In layer mapping configuration 301, for example, SCI-2 may be repeated across the layers of each MIMO codeword.

That is, in layer mapping configuration 301, C-M0, C-M1, and C-M2 may be mapped to Layer 0 and the same C-M0, C-M1, and C-M2 may be mapped to Layer 1 (e.g., as Layer 0 and Layer 1 may be associated with a first MIMO codeword of TB 305-a). Further, C-M0', C-M1', and C-M2' may be mapped to Layer 2 and the same C-M0', C-M1', and C-M2' may be mapped to Layer 3 (e.g., as Layer 2 and Layer 3 may be associated with a second MIMO codeword of TB 305-b). It should be noted that C-M0, C-M1, and C-M2 may denote modulation symbols of control information associated with TB 305-a, and that C-M0', C-M1', and C-M2' may denote modulation symbols of control information associated with TB 305-b (e.g., which may be different control information from the control information associated with TB 305-a).

Further, in layer mapping configuration 301, data information may be extended across layers associated with each MIMO codeword. For instance, D-M0, D-M1, D-M2 may be mapped to Layer 0 and additional or subsequent D-M3, D-M4, and D-M5 may be mapped to Layer 1 (e.g., D-M0, D-M1, D-M2, D-M3, D-M4, and D-M5 may be extended across the two layers Layer 0 and Layer 1, where D-M0, D-M1, D-M2, D-M3, D-M4, and D-M5 may denote data information associated with a first codeword or with TB 305-a). Further, D-M0', D-M1', D-M2' may be mapped to Layer 2 and additional or subsequent D-M3', D-M4', and D-M5' may be mapped to Layer 3 (e.g., D-M0', D-M1', D-M2', D-M3', D-M4', and D-M5' may be extended across the two layers Layer 2 and Layer 3, where D-M0', D-M1', D-M2', D-M3', D-M4', and D-M5' may denote data information associated with a second codeword or with TB 305-b, which may be different from the data information associated with the first codeword or with the TB 305-a).

Layer mapping configuration 301 may provide for improved robustness and reliability of control information across each TB 305 or across each codeword, as well as improved throughput of data information for each TB 305 or for each codeword. In some cases, control information denoted by C-M0, C-M1, and C-M2 may include control information for decoding of data information denoted by D-M0, D-M1, D-M2, D-M3, D-M4, and D-M5. Similarly, in some cases, control information denoted by C-M0', C-M1', and C-M2' may include control information for decoding of data information denoted by D-M0', D-M1', D-M2', D-M3', D-M4', and D-M5'.

Layer mapping configuration 302 may illustrate a layer mapping configuration where PSSCH may be repeated over a number of layers, independently of whether those layers belong to the same MIMO codeword or not. For example, layer mapping configuration 302 may illustrate TBs 305-c and 305-d, where a first codeword may be mapped to layers of TB 305-c (e.g., Layer 0, Layer 1, and Layer 2) and a second codeword may be mapped to layers of TB 305-d (e.g., Layer 4). In layer mapping configuration 302, for example, SCI-2 may be repeated across a number of layers (e.g., two layers), independently of whether those layers belong to the same MIMO codeword or not. For instance, a repetition level may be defined (e.g., a repetition level of two layers in the example of FIG. 3C), and SCI (e.g., SCI-2) may be repeated across sets of layers (e.g., sets of two layers) based on the repetition level, independently of whether layers of a particular set of layers belong to the same MIMO codeword or same TB 305.

That is, in layer mapping configuration 302, a repetition level may be configured as two layers. As such, C-M0, C-M1, and C-M2 may be mapped to Layer 0 and the same C-M0, C-M1, and C-M2 may be mapped to Layer 1. Further, C-M0', C-M1', and C-M2' may be mapped to Layer 2 and the same C-M0', C-M1', and C-M2' may be mapped to Layer 3 (e.g., even though Layer 2 may be associated with a first codeword of TB 305-c and Layer 3 may be associated with a second codeword of TB 305-d). In some cases, C-M0, C-M1, and C-M2 may denote modulation symbols of control information for decoding TB 305-c (e.g., for decoding D-M0, D-M1, D-M2, D-M3, D-M4, D-M5, D-M6, D-M7, and D-M8), and C-M0', C-M1', and C-M2' may denote modulation symbols of control information (e.g., which may be different control information denoted by C-M0, C-M1, and C-M2) for decoding TB 305-d (e.g., for decoding D-M0', D-M1', and D-M2').

Further, in layer mapping configuration 302, data information may be extended across layers associated with each MIMO codeword. For instance, D-M0, D-M1, D-M2 may be mapped to Layer 0 and additional or subsequent D-M3, D-M4, and D-M5 may be mapped to Layer 1 and additional or subsequent D-M6, D-M7, and D-M8 may be mapped to Layer 2 (e.g., D-M0, D-M1, D-M2, D-M3, D-M4, D-M5, D-M6, D-M7, and D-M8 may be extended across the three layers Layer 0, Layer 1, and Layer 2). D-M0, D-M1, D-M2, D-M3, D-M4, D-M5, D-M6, D-M7, and D-M8 may denote data information associated with a first codeword or with TB 305-c). Further, D-M0', D-M1', D-M2' may be mapped to Layer 3 (e.g., and D-M0', D-M1', D-M2' may denote data information associated with a second codeword or with TB 305-d, which may be different data information from the data information associated with the first codeword or with the TB 305-c).

Layer mapping configuration 302 may provide for improved robustness and reliability of control information, improved throughput of data information for each TB 305 or for each codeword, flexibility in configuration of numbers of layers associated with PSSCH codewords, etc. In some cases, layer mapping configuration 302 may provide for a same repetition of control information regardless of the number of layers configured per TB 305. For instance, layer mapping configuration 302 may provide two layer repetition of SCI for TB 305-c and TB 305-d, where TB 305-c may be associated with three layers and TB 305-d may be associated with one layer. Generally, layer mapping configuration 302 may provide for repetition level-based SCI mapping, where SCI may be mapped across sets of layers regardless of whether or not the set of layers correspond to a single codeword or different codewords (e.g., such that TBs 305 may be configured with various number of layers, and control information for decoding codewords may be repeated independently of the number of layers corresponding to each TB).

Figure 4:
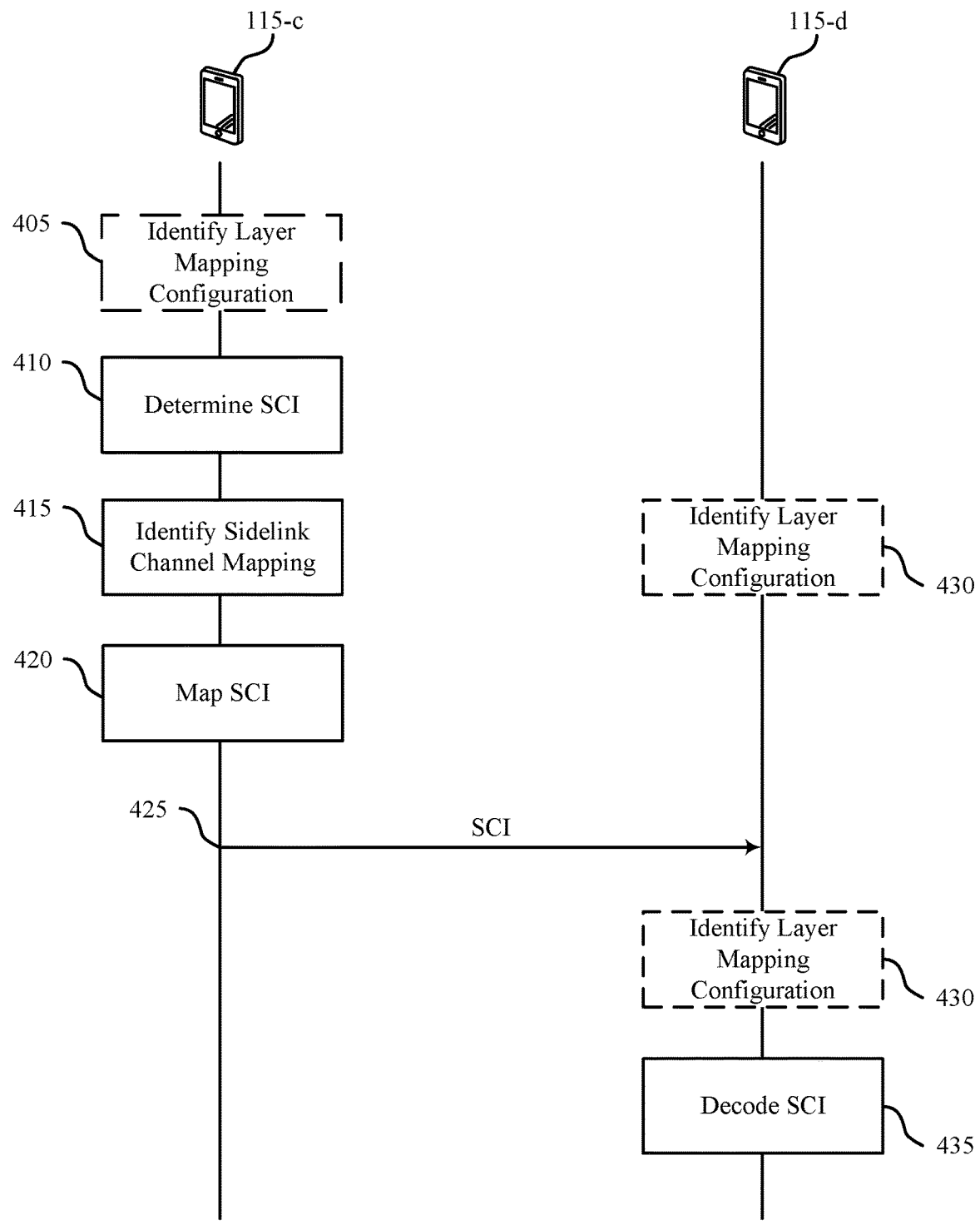
FIG. 4 illustrates an example of a process flow that supports multi-layer control in accordance with aspects of the present disclosure.

FIG. 4 illustrates an example of a process flow 400 that supports multi-layer control (e.g., in NR sidelink) in accordance with aspects of the present disclosure. In some examples, process flow 400 may implement aspects of wireless communications system 100, wireless communications system 200, layer mapping configuration 300, layer mapping configuration 301, and/or layer mapping configuration 302. The process flow 400 may include UE 115-c and UE 115-d, which may be examples of UEs 115 as described with reference to FIGS. 1 and 2. For instance, the UE 115-c may be an example of a transmitting UE and the UE 115-d may be an example of a receiving UE in a communications system supporting sidelink communications.

In the following description of the process flow 400, the operations between UE 115-c and UE 115-d may be transmitted in a different order than the order shown, or the operations performed by UE 115-c and UE 115-d may be performed in different orders or at different times. Some operations may also be left out of the process flow 400, or other operations may be added to the process flow 400. It is to be understood that while UE 115-c and UE 115-d are shown performing a number of the operations of process flow 400, any wireless device may perform the operations shown.

At 405, in some examples, UE 115-c may identify a layer mapping configuration. For example, in some cases, UE 115-c may receive an RRC parameter that configures layer mapping for SCI (e.g., a wireless communications system may semi-statically configure how PSCCH is mapped to various numbers of layers, how PSSCH is mapped to various numbers of layers, etc.). In some cases, the layer mapping configuration may be preconfigured. As discussed herein, the layer mapping configuration may be based on a number of layers associated with PSSCH, a number of layers associated with PSCCH, an effective code rate for SCI-2, a target code rate for SCI-2, etc. In some cases, the layer mapping configuration may be based on which layers (e.g., which subset of layers) of the layers associated with PSSCH are used for repetition of SCI-2.

As such, layer mapping may be preconfigured, configured via RRC parameters, etc., and UE 115-c may accordingly identify a layer mapping configuration based on PSCCH/PSSCH layers, SCI effective code rate, SCI target code rate, etc. For example, UE 115-c may identify an effective code rate for the SCI-2, and UE 115-c may identify the layer mapping configuration based on the effective code rate. In some examples, UE 115-c may identify a target code rate for the SCI-2 (e.g., a target code rate from MCS and beta offset in SCI), and UE 115-c may identify the layer mapping configuration based on the target code rate. In some cases, the number of layers, the layer mapping configuration, or both, may be identified based on an effective code rate threshold associated with the SCI-2 (e.g., some systems may aim to keep the effective code rate below some effective code rate threshold by controlling the number of layers and mapping used for SCI-2). In some cases, the layer mapping configuration may be identified per system, per resource pool, or both.

At 410, UE 115-c may determine SCI (e.g., SCI-1 for transmission in a PSCCH and SCI-2 for transmission in a PSSCH) for sidelink communications.

At 415, UE 115-c may identify that the PSSCH is mapped to at least three layers. For example, UE 115-c may identify that the PSSCH is mapped to three layers, four layers, etc., and may identifying a layer mapping configuration accordingly (e.g., in some cases the layer mapping configuration at 405 may be identified based on the number of layers the PSSCH is mapped to).

At 420, UE 115-*c* may map the SCI based on the PSSCH being mapped to the at least three layers. For example, UE 115-*c* may map the SCI based on the layer mapping configuration and the number of layers to which the PSSCH is mapped, the SCI target or effective code rate, etc. In some cases, UE 115-*c* may map SCI based on a layer mapping configuration configured per system, per resource pool, or both.

In some cases, PSCCH may be repeated for every two layers of PSSCH, and UE 115-*c* may repeat the SCI-1 across two layers of the PSCCH. In some examples, PSCCH may be mapped as a single layer, and UE 115-*c* may map the SCI-1 as a single layer of the PSCCH. In some cases, PSCCH may be mapped as a single layer for each PSSCH MIMO codeword, and UE 115-*c* may map the SCI-1 as a single layer for each codeword of the PSSCH.

In some cases, if PSSCH is for more than two MIMO codewords, SCI-2 may be repeated across the layers of each MIMO codeword. For example, SCI-2 may include a first portion associated with a first data codeword and a second portion associated with a second data codeword. UE 115-*c* may identify a first set of layers (e.g., of the at least three layers of the PSSCH) for transmission of the first data codeword and a second set of layers (e.g., of the at least three layers of the PSSCH) for transmission of the second data codeword. The UE 115-*c* may then repeat the first portion of the SCI-2 across the first set of one or more layers for transmission of the first data codeword and repeat the second portion of the SCI-2 across the second set of one or more layers for transmission of the second data codeword (e.g., as described in more detail herein, for example, with reference to FIG. 3B).

In some cases, PSSCH may be repeated over a number of layers, independently of whether those layers belong to the same MIMO codeword or not. For example, UE 115-*c* may identify a repetition level (e.g., at 405), and UE 115-*c* may identify one or more sets (e.g., two sets) of layers of the at least three layers of the PSSCH based on the layer repetition level (e.g., where the sets of layers may be associated with one or more codewords). The UE 115-*c* may repeat a first portion of the SCI-2 across a first set and repeat a second portion of the SCI-2 across a second set of layers (e.g., as described in more detail herein, for example, with reference to FIG. 3C).

In some cases, SCI-2 may be repeated across all layers. For example, UE 115-*c* may repeat the SCI-2 across each layer of the at least three layers of the PSSCH (e.g., as described in more detail herein, for example, with reference to FIG. 3A).

At 425, UE 115-*c* may transmit the SCI based on the mapping. In some cases, UE 115-*c* may transmit an indication of the layer mapping configuration in the SCI-1, where the SCI-2 is mapped to the at least three layers (e.g., at 420) based on the layer mapping configuration (e.g., in accordance with the indication of the layer mapping configuration in the SCI-1).

At 430, UE 115-*d* may identify a layer mapping configuration (e.g., based on PSSCH being mapped to at least three layers). In some examples, UE 115-*d* may receive an RRC parameter that configures layer mapping for SCI (e.g., a wireless communications system may semi-statically configure how PSCCH is mapped to various numbers of layers, how PSSCH is mapped to various numbers of layers, etc.).

In some cases, the layer mapping configuration may be preconfigured. As discussed herein, the layer mapping configuration may be based on a number of layers associated with PSSCH, a number of layers associated with PSCCH, an effective code rate for SCI-2, a target code rate for SCI-2, etc. In some cases, the layer mapping configuration may be based on which layers (e.g., which subset of layers) of the layers associated with PSSCH are used for repetition of SCI-2.

As such, layer mapping may be preconfigured, configured via RRC parameters, etc., and UE 115-*d* may accordingly identify a layer mapping configuration based on PSCCH/PSSCH layers, SCI effective code rate, SCI target code rate, etc. For example, UE 115-*d* may identify an effective code rate for the SCI-2, and UE 115-*d* may identify the layer mapping configuration based on the effective code rate. In some examples, UE 115-*d* may identify a target code rate for the SCI-2 (e.g., a target code rate from MCS and beta offset in SCI), and UE 115-*d* may identify the layer mapping configuration based on the target code rate. In some cases, the number of layers, the layer mapping configuration, or both, may be identified based on an effective code rate threshold associated with the SCI-2 (e.g., some systems may aim to keep the effective code rate below some effective code rate threshold by controlling the number of layers and mapping used for SCI-2). In some cases, the layer mapping configuration may be identified per system, per resource pool, or both.

UE 115-*d* may receive SCI (e.g., SCI including SCI-1 in a PSCCH and SCI-2 in the PSSCH) for sidelink communications at 425, and at 435 UE 115-*d* may decode the SCI based on the layer mapping configuration. In some cases, UE 115-*d* may receive an indication of the layer mapping configuration in the SCI-1, where the layer mapping configuration is identified at 430 based on the indication (e.g., 430 may be before 425, after 425, or both).

In some cases, PSCCH may be repeated for every two layers of PSSCH, and UE 115-*d* may decode the SCI-1 across two layers of the PSCCH. In some examples, PSCCH may be mapped as a single layer, and UE 115-*d* may decode the SCI-1 across a single layer of the PSCCH. In some cases, PSCCH may be mapped as a single layer for each PSCCH or PSSCH MIMO codeword, and UE 115-*d* may decode the SCI-1 across a single layer for each codeword of the PSCCH or PSSCH.

In some cases, if PSSCH is for more than two MIMO codewords, SCI-2 may be repeated across the layers of each MIMO codeword. For example, SCI-2 may include a first portion associated with a first data codeword and a second portion associated with a second data codeword. UE 115-*d* may identify a first set of layers (e.g., of the at least three layers of the PSSCH) for reception of the first data codeword and a second set of layers (e.g., of the at least three layers of the PSSCH) for reception of the second data codeword. The UE 115-*d* may then decode the first portion of the SCI-2 across the first set of one or more layers for reception of the first data codeword and decode the second portion of the SCI-2 across the second set of one or more layers for reception of the second data codeword (e.g., as described in more detail herein, for example, with reference to FIG. 3B).

In some cases, PSSCH may be repeated over a number of layers, independently of whether those layers belong to the same MIMO codeword or not. For example, UE 115-*d* may identify a repetition level (e.g., at 405), and UE 115-*d* may identify one or more sets (e.g., two sets) of layers of the at least three layers of the PSSCH based on the layer repetition level (e.g., where the sets of layers may be associated with one or more codewords). The UE 115-*d* may decode a first portion of the SCI-2 across a first set and decode a second portion of the SCI-2 across a second set of layers (e.g., as described in more detail herein, for example, with reference to FIG. 3C).

In some cases, SCI-2 may be repeated across all layers. For example, UE 115-*d* may decode the SCI-2 across each layer of the at least three layers of the PSSCH (e.g., as described in more detail herein, for example, with reference to FIG. 3A).

Figure 5:
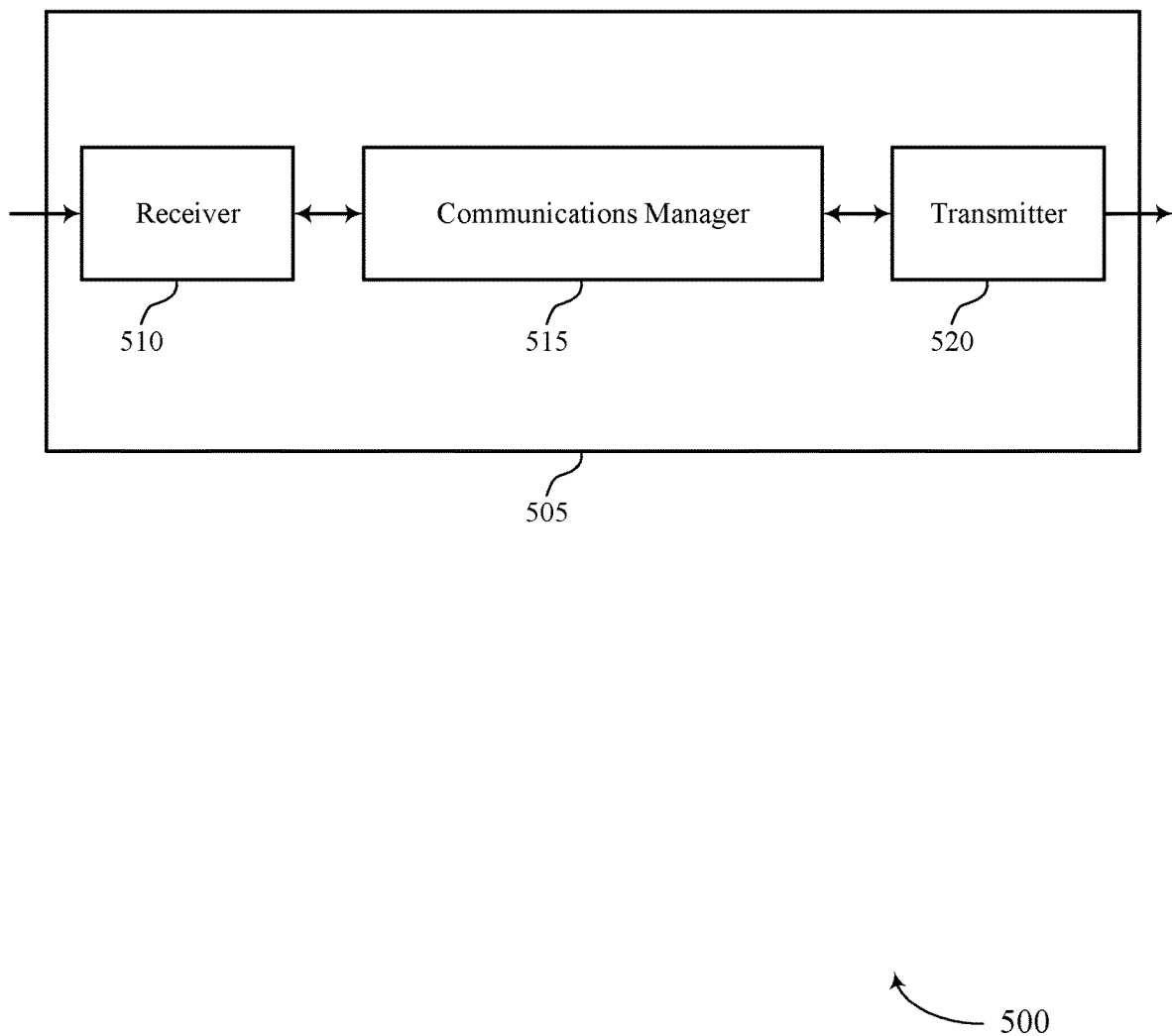
FIGS. 5 and 6 show block diagrams of devices that support multi-layer control in accordance with aspects of the present disclosure.

FIG. 5 shows a block diagram 500 of a device 505 that supports multi-layer control (e.g., in NR sidelink) in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multi-layer control in NR sidelink, etc.). Information may be passed on to other components of the device 505. The receiver 510 may be an example of aspects of the transceiver 820 described with reference to FIG. 8. The receiver 510 may utilize a single antenna or a set of antennas.

When the device 505 is configured as a transmitting device, the communications manager 515 may determine sidelink control information for sidelink communications, the sidelink control information including first stage sidelink control information for transmission in a sidelink control channel and second stage sidelink control information for transmission in a sidelink shared channel. The communications manager 515 may identify that the sidelink shared channel is mapped to at least three layers, map the sidelink control information based on the sidelink shared channel being mapped to the at least three layers, and transmit the sidelink control information based on the mapping.

When the device 505 is configured as a receiving device, the communications manager 515 may identify a layer mapping configuration based on a sidelink shared channel being mapped to at least three layers, receive sidelink control information for sidelink communications, the sidelink control information including first stage sidelink control information in a sidelink control channel and second stage sidelink control information in the sidelink shared channel, and decode the sidelink control information based on the layer mapping configuration.

In some cases, the communications manager 515 may be an example of aspects of the communications manager 810 described herein. The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
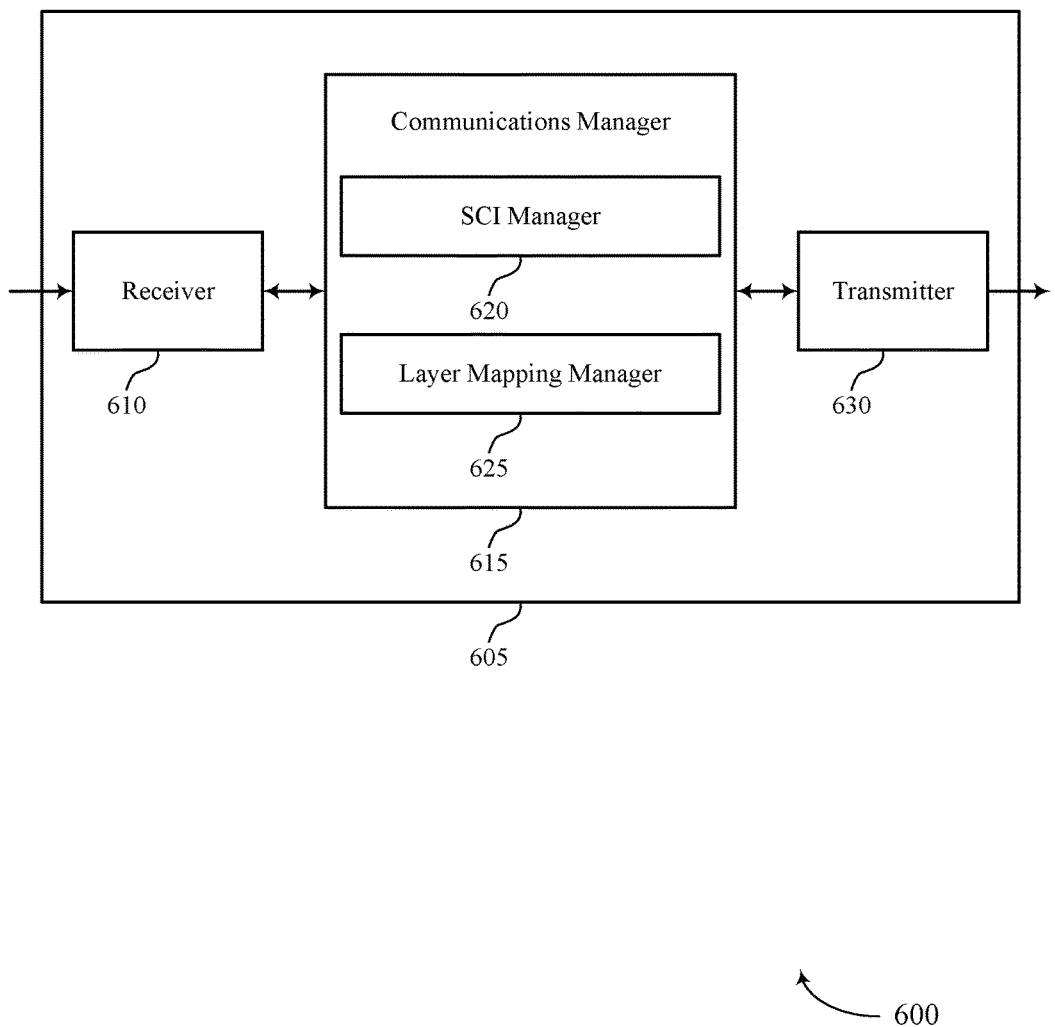

FIG. 6 shows a block diagram 600 of a device 605 that supports multi-layer control in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to multi-layer control in NR sidelink, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an SCI manager 620 and a layer mapping manager 625. The communications manager 615 may be an example of aspects of the communications manager 810 described herein.

When the device 605 is configured as a transmitting device, the SCI manager 620 may determine sidelink control information for sidelink communications, the sidelink control information including first stage sidelink control information for transmission in a sidelink control channel and second stage sidelink control information for transmission in a sidelink shared channel. The layer mapping manager 625 may identify that the sidelink shared channel is mapped to at least three layers and map the sidelink control information based on the sidelink shared channel being mapped to the at least three layers. The SCI manager 620 may transmit the sidelink control information based on the mapping.

When the device 605 is configured as a receiving device, the layer mapping manager 625 may identify a layer mapping configuration based on a sidelink shared channel being mapped to at least three layers. The SCI manager 620 may receive sidelink control information for sidelink communications, the sidelink control information including first stage sidelink control information in a sidelink control channel and second stage sidelink control information in the sidelink shared channel. The SCI manager 620 may decode the sidelink control information based on the layer mapping configuration.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
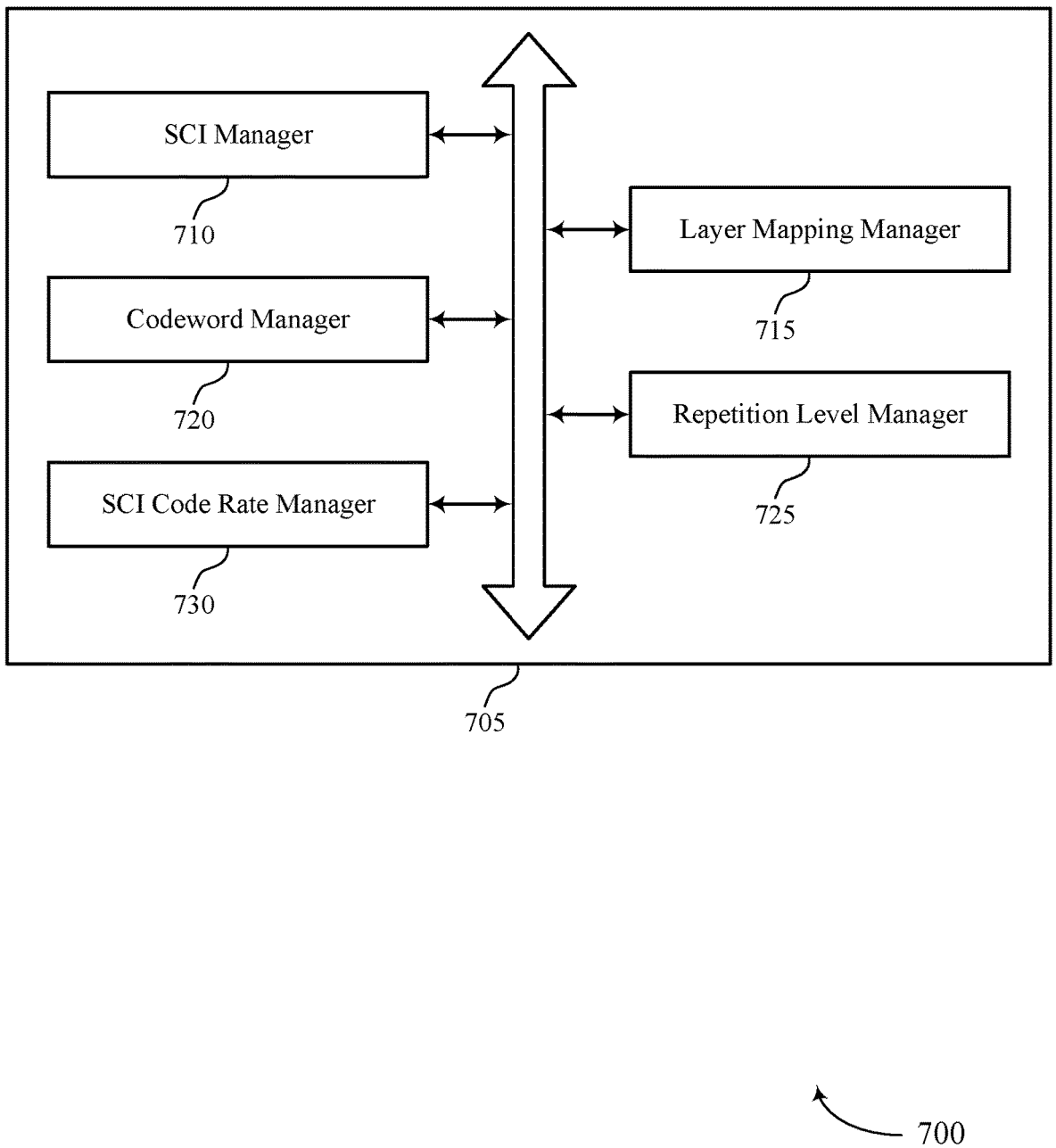
FIG. 7 shows a block diagram of a communications manager that supports multi-layer control in accordance with aspects of the present disclosure.

FIG. 7 shows a block diagram 700 of a communications manager 705 that supports multi-layer control in accordance with aspects of the present disclosure. The communications manager 705 may be an example of aspects of a communications manager 515, a communications manager 615, or a communications manager 810 described herein. The communications manager 705 may include an SCI manager 710, a layer mapping manager 715, a codeword manager 720, a repetition level manager 725, and an SCI code rate manager 730. Each of these modules may communicate, directly or indirectly, with one another (e.g., via one or more buses).

In cases where the communications manager 705 is configured as part of a transmitting device, the SCI manager 710 may determine sidelink control information for sidelink communications, the sidelink control information including first stage sidelink control information for transmission in a sidelink control channel and second stage sidelink control information for transmission in a sidelink shared channel. In some examples, the SCI manager 710 may transmit the sidelink control information based on the mapping.

In cases where the communications manager 705 is configured as part of a transmitting device, the layer mapping manager 715 may identify that the sidelink shared channel is mapped to at least three layers. In some examples, the layer mapping manager 715 may map the sidelink control information based on the sidelink shared channel being mapped to the at least three layers. In some examples, the layer mapping manager 715 may repeat the first portion of the second stage sidelink control information across the first set of one or more layers for transmission of the first data codeword. In some examples, the layer mapping manager 715 may repeat the second portion of the second stage sidelink control information across the second set of one or more layers for transmission of the second data codeword. In some examples, the layer mapping manager 715 may repeat the second stage sidelink control information across each layer of the at least three layers. In some examples, the layer mapping manager 715 may receive a radio resource control parameter.

In cases where the communications manager 705 is configured as part of a transmitting device, in some examples, the layer mapping manager 715 may identify a layer mapping configuration based on the radio resource control parameter, where the second stage sidelink control information is mapped to the at least three layers based on the layer mapping configuration. In some examples, the layer mapping manager 715 may identify a layer mapping configuration. In some examples, the layer mapping manager 715 may transmit an indication of the layer mapping configuration in the first stage sidelink control information, where the second stage sidelink control information is mapped to the at least three layers based on the layer mapping configuration. In some examples, the layer mapping manager 715 may identify a layer mapping configuration based on the effective code rate, where the second stage sidelink control information is mapped to the at least three layers based on the layer mapping configuration.

In cases where the communications manager 705 is configured as part of a transmitting device, in some examples, the layer mapping manager 715 may identify a layer mapping configuration based on the target code rate, where the second stage sidelink control information is mapped to the at least three layers based on the layer mapping configuration. In some examples, the layer mapping manager 715 may identify a number of layers associated with the sidelink shared channel. In some examples, the layer mapping manager 715 may identify a layer mapping configuration based on the number of layers associated with the sidelink shared channel, where the second stage sidelink control information is mapped to the at least three layers associated with the sidelink shared channel based on the layer mapping configuration. In some examples, the layer mapping manager 715 may identify which layers of the at least three layers are used for repetition of the second stage sidelink control information.

In cases where the communications manager 705 is configured as part of a transmitting device, in some examples, the layer mapping manager 715 may repeat the first stage sidelink control information across two layers of the sidelink control channel. In some examples, the layer mapping manager 715 may map the first stage sidelink control information as a single layer of the sidelink control channel. In some examples, the layer mapping manager 715 may map the first stage sidelink control information as a single layer for each codeword of the sidelink control channel. Additionally or Alternatively, the layer mapping manager 715 may map the first stage sidelink control information to a single layer for each codeword of the sidelink shared channel.

In cases where the communications manager 705 is configured as part of a transmitting device, in some examples, the layer mapping manager 715 may identify a layer mapping configuration per system, per resource pool, or both, where the first stage sidelink control information is mapped to the sidelink control channel based on the layer mapping configuration. In some cases, the layer mapping configuration is identified per system, per resource pool, or both. In some cases, the number of layers, the layer mapping configuration, or both, are identified based on an effective code rate threshold associated with the second stage sidelink control information.

In cases where the communications manager 705 is configured as part of a transmitting device, the codeword manager 720 may identify a first set of one or more layers of the at least three layers of the sidelink shared channel for transmission of a first data codeword. In some examples, identifying a second set of one or more layers of the at least three layers of the sidelink shared channel for transmission of a second data codeword, where the second stage sidelink control information includes a first portion associated with the first data codeword and a second portion associated with the second data codeword.

In cases where the communications manager 705 is configured as part of a transmitting device, the repetition level manager 725 may identify a layer repetition level. In some examples, the repetition level manager 725 may identify one or more sets of layers of the at least three layers of the sidelink shared channel based on the layer repetition level, where the sidelink control information is mapped based on the one or more sets of layers. In some examples, the repetition level manager 725 may repeat a first portion of the second stage sidelink control information across a first set of the one or more sets of layers. In some examples, the repetition level manager 725 may repeat a second portion of the second stage sidelink control information across a second set of the one or more sets of layers. In some cases, a first set of the one or more sets of layers is associated with two different data codewords.

In cases where the communications manager 705 is configured as part of a transmitting device, the SCI code rate manager 730 may identify an effective code rate for the second stage sidelink control information. In some examples, the SCI code rate manager 730 may identify a target code rate for the second stage sidelink control information.

In cases where the communications manager 705 is configured as part of a receiving device, in some examples, the SCI manager 710 may receive sidelink control information for sidelink communications, the sidelink control information including first stage sidelink control information in a sidelink control channel and second stage sidelink control information in the sidelink shared channel. In some examples, the SCI manager 710 may decode the sidelink control information based on the layer mapping configuration. In some examples, the SCI manager 710 may decode repetitions of the second stage sidelink control information across each layer of the at least three layers. In some examples, the SCI manager 710 may receive an indication of the layer mapping configuration in the first stage sidelink control information, where the layer mapping configuration is identified based on the indication.

In cases where the communications manager 705 is configured as part of a receiving device, in some examples, the layer mapping manager 715 may identify a layer mapping configuration based on a sidelink shared channel being mapped to at least three layers. In some examples, the layer mapping manager 715 may receive a radio resource control parameter, where the layer mapping configuration is identified based on the radio resource control parameter. In some examples, the layer mapping manager 715 may identify a number of layers associated with the sidelink shared channel, where the layer mapping configuration is identified based on the number of layers associated with the sidelink shared channel. In some examples, the layer mapping manager 715 may identify which layers of the at least three layers are used for repetition of the second stage sidelink control information. In some cases, the layer mapping configuration is identified per system, per resource pool, or both. In some cases, the number of layers, the layer mapping configuration, or both, are identified based on an effective code rate threshold associated with the second stage sidelink control information. In some cases, the first stage sidelink control information is repeated across two layers of the sidelink control channel. In some cases, the first stage sidelink control information is mapped to each layer of the sidelink control channel. In some cases, the first stage sidelink control information is mapped as a single layer for each codeword of the sidelink control channel. In some cases, the first stage sidelink control information is mapped as a single layer for each codeword of the sidelink shared channel.

In cases where the communications manager 705 is configured as part of a receiving device, in some examples, the codeword manager 720 may identify a first set of one or more layers of the at least three layers of the sidelink shared channel for reception of a first data codeword. In some examples, identifying a second set of one or more layers of the at least three layers of the sidelink shared channel for reception of a second data codeword, where the second stage sidelink control information includes a first portion associated with the first data codeword and a second portion associated with the second data codeword. In some examples, the codeword manager 720 may decode repetition of the first portion of the second stage sidelink control information across the first set of one or more layers for reception of the first data codeword. In some examples, the codeword manager 720 may decode repetition of the second portion of the second stage sidelink control information across the second set of one or more layers for reception of the second data codeword.

In cases where the communications manager 705 is configured as part of a receiving device, in some examples, the repetition level manager 725 may identify a layer repetition level. In some examples, the repetition level manager 725 may identify one or more sets of layers of the at least three layers of the sidelink shared channel based on the layer repetition level, where the sidelink control information is decoded based on the one or more sets of layers. In some examples, the repetition level manager 725 may decode repetitions of a first portion of the second stage sidelink control information across a first set of the one or more sets of layers. In some examples, the repetition level manager 725 may decode repetitions of a second portion of the second stage sidelink control information across a second set of the one or more sets of layers. In some cases, a first set of the one or more sets of layers is associated with two different data codewords.

In cases where the communications manager 705 is configured as part of a receiving device, in some examples, the SCI code rate manager 730 may identify an effective code rate for the second stage sidelink control information, where the layer mapping configuration is identified based on the effective code rate. In some examples, the SCI code rate manager 730 may identify a target code rate for the second stage sidelink control information, where the layer mapping configuration is identified based on the target code rate.

Figure 8:
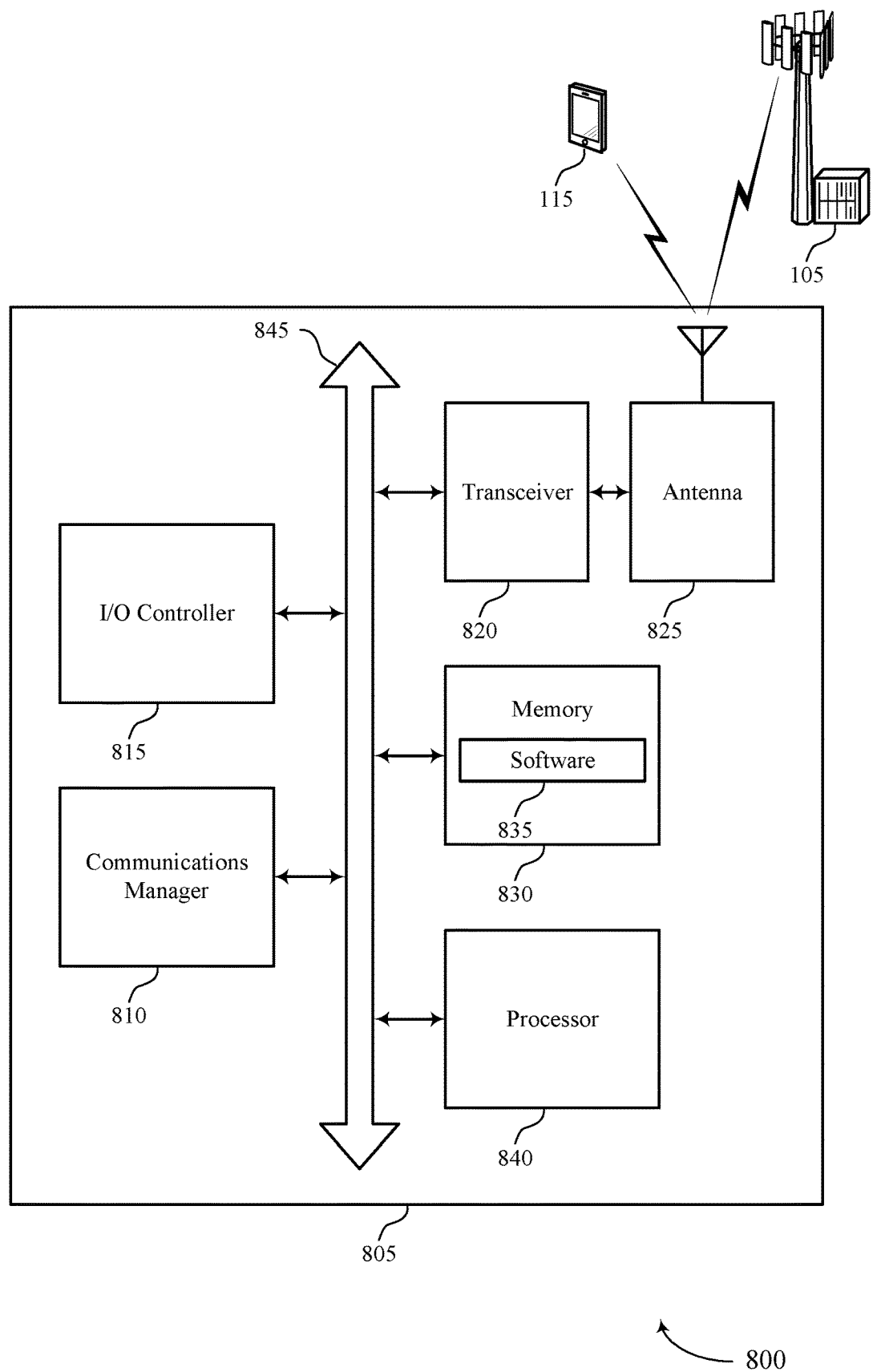
FIG. 8 shows a diagram of a system including a device that supports multi-layer control in accordance with aspects of the present disclosure.

FIG. 8 shows a diagram of a system 800 including a device 805 that supports multi-layer control in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In cases where the device 805 is configured as a transmitting device, the communications manager 810 may determine sidelink control information for sidelink communications, the sidelink control information including first stage sidelink control information for transmission in a sidelink control channel and second stage sidelink control information for transmission in a sidelink shared channel. The communications manager 810 may identify that the sidelink shared channel is mapped to at least three layers, and map the sidelink control information based on the sidelink shared channel being mapped to the at least three layers. The communications manager 810 may transmit the sidelink control information based on the mapping.

In cases where the device 805 is configured as a receiving device, the communications manager 810 may identify a layer mapping configuration based on a sidelink shared channel being mapped to at least three layers. The communications manager 810 may receive sidelink control information for sidelink communications, the sidelink control information including first stage sidelink control information in a sidelink control channel and second stage sidelink control information in the sidelink shared channel. The communications manager 810 may decode the sidelink control information based on the layer mapping configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code or software 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-layer control in NR sidelink).

The software 835 may include instructions to implement aspects of the present disclosure, including instructions to support wireless communications. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

Figure 9:
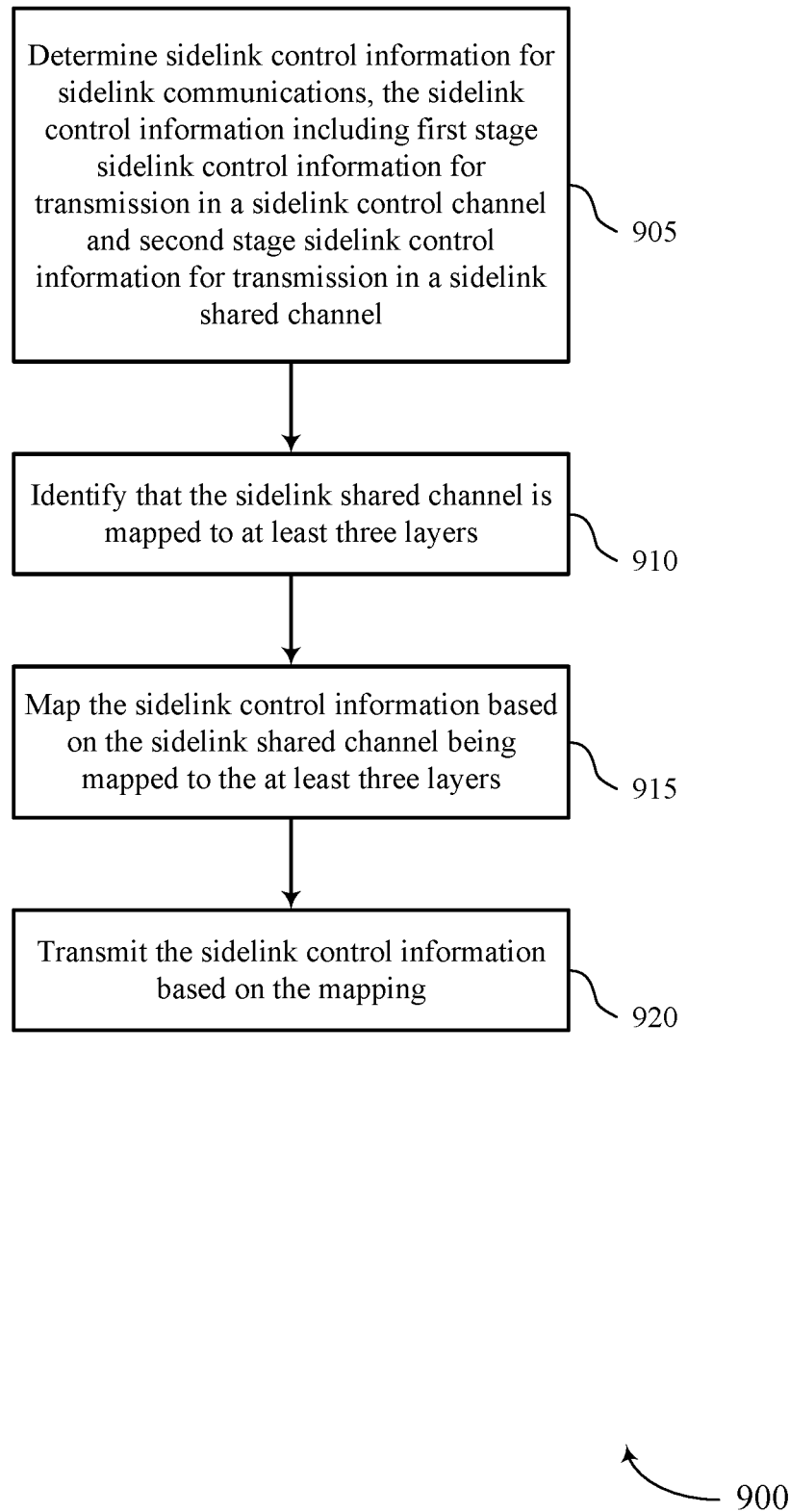
FIGS. 9 through 13 show flowcharts illustrating methods that support multi-layer control in accordance with aspects of the present disclosure.

FIG. 9 shows a flowchart illustrating a method 900 that supports multi-layer control in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may determine sidelink control information for sidelink communications, the sidelink control information including first stage sidelink control information for transmission in a sidelink control channel and second stage sidelink control information for transmission in a sidelink shared channel. The operations of 905 may be performed according to the methods described herein. In some examples, aspects of the operations of 905 may be performed by an SCI manager as described with reference to FIGS. 5 through 8.

At 910, the UE may identify that the sidelink shared channel is mapped to at least three layers. The operations of 910 may be performed according to the methods described herein. In some examples, aspects of the operations of 910 may be performed by a layer mapping manager as described with reference to FIGS. 5 through 8.

At 915, the UE may map the sidelink control information based on the sidelink shared channel being mapped to the at least three layers. The operations of 915 may be performed according to the methods described herein. In some examples, aspects of the operations of 915 may be performed by a layer mapping manager as described with reference to FIGS. 5 through 8.

At 920, the UE may transmit the sidelink control information based on the mapping. The operations of 920 may be performed according to the methods described herein. In some examples, aspects of the operations of 920 may be performed by an SCI manager as described with reference to FIGS. 5 through 8.

Figure 10:
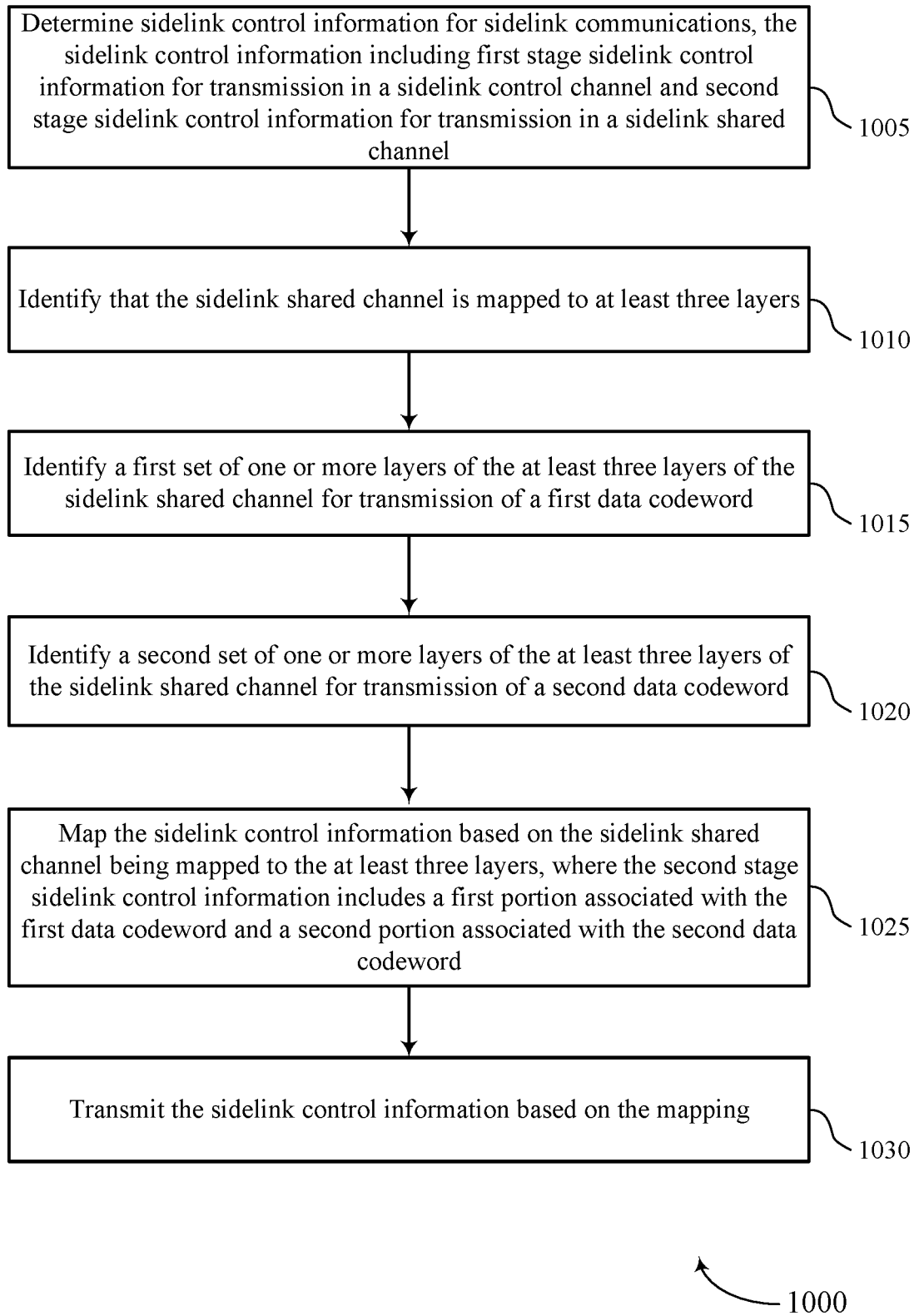

FIG. 10 shows a flowchart illustrating a method 1000 that supports multi-layer control in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may determine sidelink control information for sidelink communications, the sidelink control information including first stage sidelink control information for transmission in a sidelink control channel and second stage sidelink control information for transmission in a sidelink shared channel. The operations of 1005 may be performed according to the methods described herein. In some examples, aspects of the operations of 1005 may be performed by an SCI manager as described with reference to FIGS. 5 through 8.

At 1010, the UE may identify that the sidelink shared channel is mapped to at least three layers. The operations of 1010 may be performed according to the methods described herein. In some examples, aspects of the operations of 1010 may be performed by a layer mapping manager as described with reference to FIGS. 5 through 8.

At 1015, the UE may identify a first set of one or more layers of the at least three layers of the sidelink shared channel for transmission of a first data codeword. The operations of 1015 may be performed according to the methods described herein. In some examples, aspects of the operations of 1015 may be performed by a codeword manager as described with reference to FIGS. 5 through 8.

At 1020, the UE may identify a second set of one or more layers of the at least three layers of the sidelink shared channel for transmission of a second data codeword. The operations of 1020 may be performed according to the methods described herein. In some examples, aspects of the operations of 1020 may be performed by a codeword manager as described with reference to FIGS. 5 through 8.

At 1025, the UE may map the sidelink control information based on the sidelink shared channel being mapped to the at least three layers, where the second stage sidelink control information includes a first portion associated with the first data codeword and a second portion associated with the second data codeword. The operations of 1025 may be performed according to the methods described herein. In some examples, aspects of the operations of 1025 may be performed by a layer mapping manager as described with reference to FIGS. 5 through 8.

At 1030, the UE may transmit the sidelink control information based on the mapping. The operations of 1030 may be performed according to the methods described herein. In some examples, aspects of the operations of 1030 may be performed by an SCI manager as described with reference to FIGS. 5 through 8.

Figure 11:
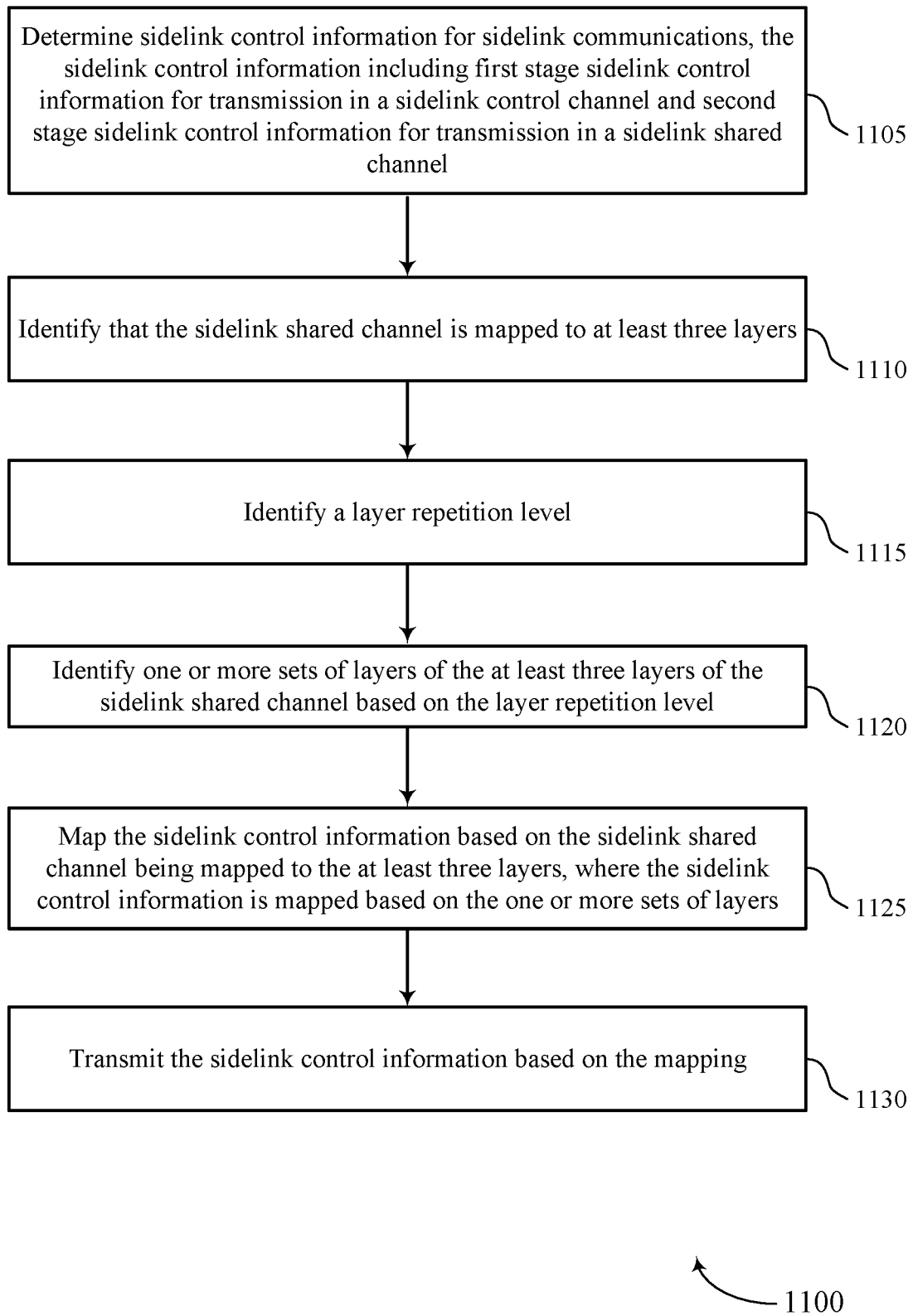

FIG. 11 shows a flowchart illustrating a method 1100 that supports multi-layer control in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may determine sidelink control information for sidelink communications, the sidelink control information including first stage sidelink control information for transmission in a sidelink control channel and second stage sidelink control information for transmission in a sidelink shared channel. The operations of 1105 may be performed according to the methods described herein. In some examples, aspects of the operations of 1105 may be performed by an SCI manager as described with reference to FIGS. 5 through 8.

At 1110, the UE may identify that the sidelink shared channel is mapped to at least three layers. The operations of 1110 may be performed according to the methods described herein. In some examples, aspects of the operations of 1110 may be performed by a layer mapping manager as described with reference to FIGS. 5 through 8.

At 1115, the UE may identify a layer repetition level. The operations of 1115 may be performed according to the methods described herein. In some examples, aspects of the operations of 1115 may be performed by a repetition level manager as described with reference to FIGS. 5 through 8.

At 1120, the UE may identify one or more sets of layers of the at least three layers of the sidelink shared channel based on the layer repetition level. The operations of 1120 may be performed according to the methods described herein. In some examples, aspects of the operations of 1120 may be performed by a repetition level manager as described with reference to FIGS. 5 through 8.

At 1125, the UE may map the sidelink control information based on the sidelink shared channel being mapped to the at least three layers, where the sidelink control information is mapped based on the one or more sets of layers. The operations of 1125 may be performed according to the methods described herein. In some examples, aspects of the operations of 1125 may be performed by a layer mapping manager as described with reference to FIGS. 5 through 8.

At 1130, the UE may transmit the sidelink control information based on the mapping. The operations of 1130 may be performed according to the methods described herein. In some examples, aspects of the operations of 1130 may be performed by an SCI manager as described with reference to FIGS. 5 through 8.

Figure 12:
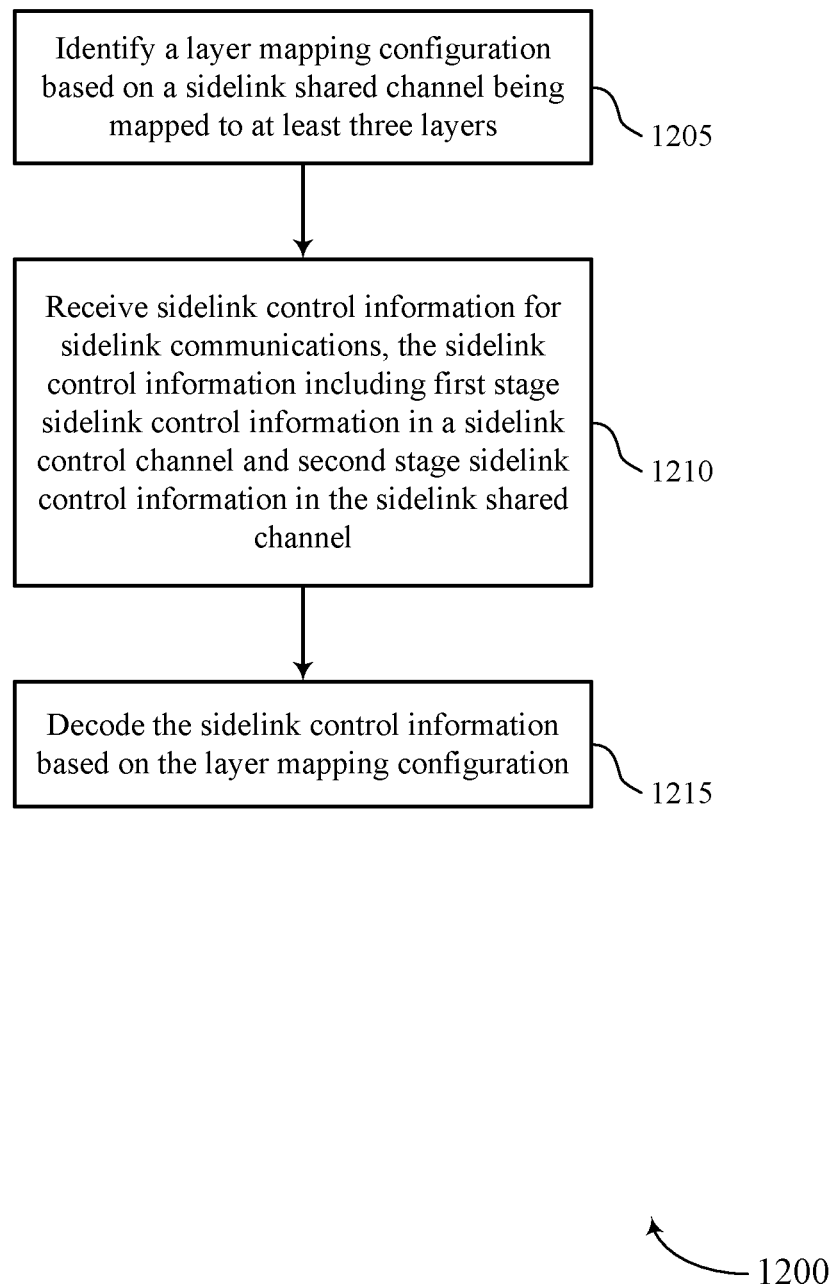

FIG. 12 shows a flowchart illustrating a method 1200 that supports multi-layer control in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may identify a layer mapping configuration based on a sidelink shared channel being mapped to at least three layers. The operations of 1205 may be performed according to the methods described herein. In some examples, aspects of the operations of 1205 may be performed by a layer mapping manager as described with reference to FIGS. 5 through 8.

At 1210, the UE may receive sidelink control information for sidelink communications, the sidelink control information including first stage sidelink control information in a sidelink control channel and second stage sidelink control information in the sidelink shared channel. The operations of 1210 may be performed according to the methods described herein. In some examples, aspects of the operations of 1210 may be performed by an SCI manager as described with reference to FIGS. 5 through 8.

At 1215, the UE may decode the sidelink control information based on the layer mapping configuration. The operations of 1215 may be performed according to the methods described herein. In some examples, aspects of the operations of 1215 may be performed by an SCI manager as described with reference to FIGS. 5 through 8.

Figure 13:
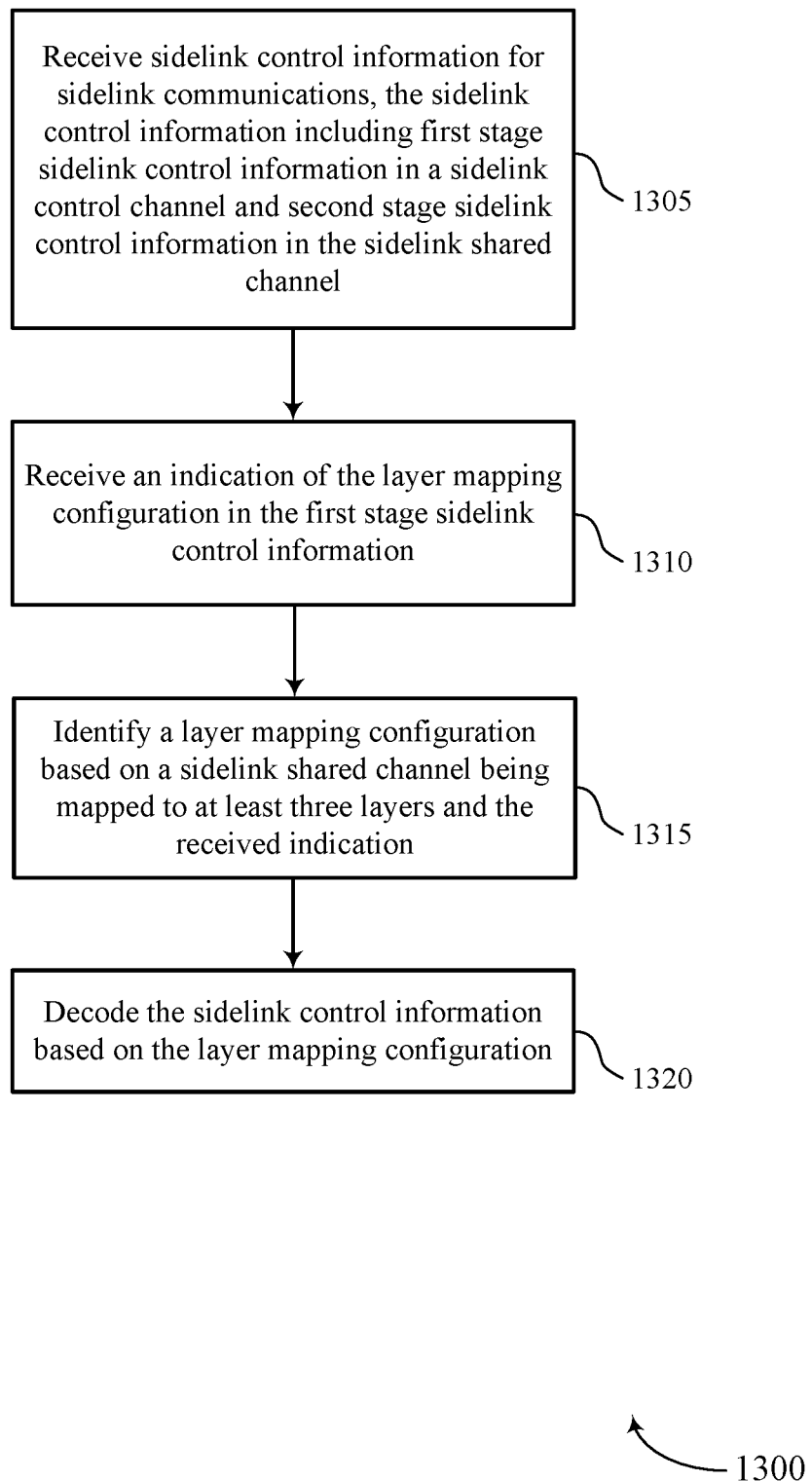

FIG. 13 shows a flowchart illustrating a method 1300 that supports multi-layer control in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive sidelink control information for sidelink communications, the sidelink control information including first stage sidelink control information in a sidelink control channel and second stage sidelink control information in the sidelink shared channel. The operations of 1305 may be performed according to the methods described herein. In some examples, aspects of the operations of 1305 may be performed by an SCI manager as described with reference to FIGS. 5 through 8.

At 1310, the UE may receive an indication of the layer mapping configuration in the first stage sidelink control information. The operations of 1310 may be performed according to the methods described herein. In some examples, aspects of the operations of 1310 may be performed by an SCI manager as described with reference to FIGS. 5 through 8.

At 1315, the UE may identify a layer mapping configuration based on a sidelink shared channel being mapped to at least three layers and the received indication. The operations of 1315 may be performed according to the methods described herein. In some examples, aspects of the operations of 1315 may be performed by a layer mapping manager as described with reference to FIGS. 5 through 8.

At 1320, the UE may decode the sidelink control information (e.g., the second stage sidelink control information) based on the layer mapping configuration. The operations of 1320 may be performed according to the methods described herein. In some examples, aspects of the operations of 1320 may be performed by an SCI manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a transmitting UE, comprising: determining sidelink control information for sidelink communications, the sidelink control information including first stage sidelink control information for transmission in a sidelink control channel and second stage sidelink control information for transmission in a sidelink shared channel; identifying that the sidelink shared channel is mapped to at least three layers; mapping the sidelink control information based at least in part on the sidelink shared channel being mapped to the at least three layers; and transmitting the sidelink control information based at least in part on the mapping.

Aspect 2: The method of aspect 1, further comprising: identifying a first set of one or more layers of the at least three layers of the sidelink shared channel for transmission of a first data codeword; and identifying a second set of one or more layers of the at least three layers of the sidelink shared channel for transmission of a second data codeword, wherein the second stage sidelink control information comprises a first portion associated with the first data codeword and a second portion associated with the second data codeword.

Aspect 3: The method of aspect 2, wherein mapping the sidelink control information comprises: repeating the first portion of the second stage sidelink control information across the first set of one or more layers for transmission of the first data codeword; and repeating the second portion of the second stage sidelink control information across the second set of one or more layers for transmission of the second data codeword.

Aspect 4: The method of any of aspects 1 through 3, further comprising: identifying a layer repetition level; and identifying one or more sets of layers of the at least three layers of the sidelink shared channel based at least in part on the layer repetition level, wherein the sidelink control information is mapped based at least in part on the one or more sets of layers.

Aspect 5: The method of aspect 4, wherein mapping the sidelink control information comprises: repeating a first portion of the second stage sidelink control information across a first set of the one or more sets of layers; and repeating a second portion of the second stage sidelink control information across a second set of the one or more sets of layers.

Aspect 6: The method of any of aspects 4 through 5, wherein a first set of the one or more sets of layers is associated with two different data codewords.

Aspect 7: The method of any of aspects 1 through 6, wherein mapping the sidelink control information comprises: repeating the second stage sidelink control information across each layer of the at least three layers.

Aspect 8: The method of any of aspects 1 through 7, further comprising: receiving a radio resource control parameter; and identifying a layer mapping configuration based at least in part on the radio resource control parameter, wherein the second stage sidelink control information is mapped to the at least three layers based at least in part on the layer mapping configuration.

Aspect 9: The method of aspect 8, wherein the layer mapping configuration is identified per system, per resource pool, or both.

Aspect 10: The method of any of aspects 1 through 9, further comprising: identifying a layer mapping configuration; and transmitting an indication of the layer mapping configuration in the first stage sidelink control information, wherein the second stage sidelink control information is mapped to the at least three layers based at least in part on the layer mapping configuration.

Aspect 11: The method of any of aspects 1 through 10, further comprising: identifying an effective code rate for the second stage sidelink control information; and identifying a layer mapping configuration based at least in part on the effective code rate, wherein the second stage sidelink control information is mapped to the at least three layers based at least in part on the layer mapping configuration.

Aspect 12: The method of any of aspects 1 through 11, further comprising: identifying a target code rate for the second stage sidelink control information; and identifying a layer mapping configuration based at least in part on the target code rate, wherein the second stage sidelink control information is mapped to the at least three layers based at least in part on the layer mapping configuration.

Aspect 13: The method of any of aspects 1 through 12, further comprising: identifying a number of layers associated with the sidelink shared channel; and identifying a layer mapping configuration based at least in part on the number of layers associated with the sidelink shared channel, wherein the second stage sidelink control information is mapped to the at least three layers associated with the sidelink shared channel based at least in part on the layer mapping configuration.

Aspect 14: The method of aspect 13, wherein identifying the layer mapping configuration comprises: identifying which layers of the at least three layers are used for repetition of the second stage sidelink control information.

Aspect 15: The method of any of aspects 13 through 14, wherein the number of layers, the layer mapping configuration, or both, are identified based at least in part on an effective code rate threshold associated with the second stage sidelink control information.

Aspect 16: The method of any of aspects 1 through 15, wherein mapping the sidelink control information comprises: repeating the first stage sidelink control information across two layers of the sidelink control channel.

Aspect 17: The method of any of aspects 1 through 16, wherein mapping the sidelink control information comprises: mapping the first stage sidelink control information as a single layer of the sidelink control channel.

Aspect 18: The method of any of aspects 1 through 17, wherein mapping the sidelink control information comprises: mapping the first stage sidelink control information as a single layer for each codeword of the sidelink control channel.

Aspect 19: The method of any of aspects 1 through 18, wherein mapping the sidelink control information comprises: mapping the first stage sidelink control information as a single layer for each codeword of the sidelink shared channel.

Aspect 20: The method of any of aspects 1 through 19, further comprising: identifying a layer mapping configuration per system, per resource pool, or both, wherein the first stage sidelink control information is mapped to the sidelink control channel based at least in part on the layer mapping configuration.

Aspect 21: An apparatus for wireless communication at a transmitting UE, comprising a processor; memory coupled with the processor; and instructions stored in the memory and executable by the processor to cause the apparatus to perform a method of any of aspects 1 through 20.

Aspect 22: An apparatus for wireless communication at a transmitting UE, comprising at least one means for performing a method of any of aspects 1 through 20.

Aspect 23: A non-transitory computer-readable medium storing code for wireless communication at a transmitting UE, the code comprising instructions executable by a processor to perform a method of any of aspects 1 through 20.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   determining sidelink control information for sidelink communications, the sidelink control information including first stage sidelink control information for transmission in a sidelink control channel and second stage sidelink control information for transmission in a sidelink shared channel;
   identifying that the sidelink shared channel is mapped to three or more spatial layers, the spatial layers being multiple-input and multiple-output (MIMO) layers;
   identifying a first set of one or more spatial layers of the three or more spatial layers of the sidelink shared channel for transmission of a first data codeword;
   identifying a second set of one or more spatial layers of the three or more spatial layers of the sidelink shared channel for transmission of a second data codeword, wherein the second stage sidelink control information comprises a first allocation associated with the first data codeword and a second allocation associated with the second data codeword, and wherein the first allocation associated with the first data codeword is different from the second allocation associated with the second data codeword and a portion of the first allocation is the same as a portion of the second allocation;
   mapping the first stage sidelink control information to at least two separate spatial layers of the sidelink control channel and mapping the second stage sidelink control information to at least two separate spatial layers of the three or more spatial layers of the sidelink shared channel based at least in part on the identifying that the sidelink shared channel is mapped to the three or more spatial layers; and
   transmitting the sidelink control information based at least in part on the mapping.

2. The method of claim 1, wherein the mapping comprises:
   repeating the first portion of the second stage sidelink control information across the first set of one or more spatial layers for transmission of the first data codeword; and
   repeating the second portion of the second stage sidelink control information across the second set of one or more spatial layers for transmission of the second data codeword.

3. The method of claim 1, further comprising:
   identifying a spatial layer repetition level; and
   identifying one or more sets of spatial layers of the three or more spatial layers of the sidelink shared channel based at least in part on the spatial layer repetition level, wherein the sidelink control information is mapped based at least in part on the one or more sets of spatial layers.

4. The method of claim 3, wherein the mapping comprises:
repeating a first portion of the second stage sidelink control information across a first set of the one or more sets of spatial layers; and
repeating a second portion of the second stage sidelink control information across a second set of the one or more sets of spatial layers.

5. The method of claim 3, wherein a first set of the one or more sets of spatial layers is associated with two different data codewords.

6. The method of claim 1, wherein the mapping comprises:
repeating the second stage sidelink control information across each spatial layer of the three or more spatial layers.

7. The method of claim 1, further comprising:
receiving a radio resource control parameter; and
identifying a spatial layer mapping configuration based at least in part on the radio resource control parameter, wherein the second stage sidelink control information is mapped to the three or more spatial layers based at least in part on the spatial layer mapping configuration.

8. The method of claim 7, wherein the spatial layer mapping configuration corresponds to a communications system associated with the UE, a resource pool, or both.

9. The method of claim 1, further comprising:
identifying a spatial layer mapping configuration; and
transmitting an indication of the spatial layer mapping configuration in the first stage sidelink control information, wherein the second stage sidelink control information is mapped to the three or more spatial layers based at least in part on the spatial layer mapping configuration.

10. The method of claim 1, further comprising:
identifying an effective code rate for the second stage sidelink control information; and
identifying a spatial layer mapping configuration based at least in part on the effective code rate, wherein the second stage sidelink control information is mapped to the three or more spatial layers based at least in part on the spatial layer mapping configuration.

11. The method of claim 1, further comprising:
identifying a target code rate for the second stage sidelink control information; and
identifying a spatial layer mapping configuration based at least in part on the target code rate, wherein the second stage sidelink control information is mapped to the three or more spatial layers based at least in part on the spatial layer mapping configuration.

12. The method of claim 1, further comprising:
identifying a quantity of spatial layers associated with the sidelink shared channel; and
identifying a spatial layer mapping configuration based at least in part on the quantity of spatial layers associated with the sidelink shared channel, wherein the second stage sidelink control information is mapped to the three or more spatial layers associated with the sidelink shared channel based at least in part on the spatial layer mapping configuration.

13. The method of claim 12, wherein identifying the spatial layer mapping configuration comprises:
identifying which spatial layers of the three or more spatial layers are used for repetition of the second stage sidelink control information.

14. The method of claim 12, wherein the quantity of spatial layers, the spatial layer mapping configuration, or both, are identified based at least in part on an effective code rate threshold associated with the second stage sidelink control information.

15. The method of claim 1, wherein the mapping comprises:
repeating the first stage sidelink control information across the at least two separate spatial layers of the sidelink control channel.

16. The method of claim 1, wherein the mapping comprises:
mapping the first stage sidelink control information as a single spatial layer for each of a plurality of codewords of the sidelink control channel.

17. The method of claim 1, further comprising:
identifying a spatial layer mapping configuration that corresponds to a communications system associated with the UE, a resource pool, or both, wherein the first stage sidelink control information is mapped to the sidelink control channel based at least in part on the spatial layer mapping configuration.

18. A user equipment (UE) for wireless communication, comprising:
one or more memories storing processor-executable code; and
one or more processors coupled with the one or more memories and individually or collectively operable to execute the code to cause the UE to:
determine sidelink control information for sidelink communications, the sidelink control information including first stage sidelink control information for transmission in a sidelink control channel and second stage sidelink control information for transmission in a sidelink shared channel;
identify that the sidelink shared channel is mapped to three or more spatial layers, the spatial layers being multiple-input and multiple-output (MIMO) layers;
identify a first set of one or more spatial layers of the three or more spatial layers of the sidelink shared channel for transmission of a first data codeword;
identify a second set of one or more spatial layers of the three or more spatial layers of the sidelink shared channel for transmission of a second data codeword, wherein the second stage sidelink control information comprises a first allocation associated with the first data codeword and a second allocation associated with the second data codeword, and wherein the first allocation associated with the first data codeword is different from the second allocation associated with the second data codeword and a portion of the first allocation is the same as a portion of the second allocation;
map the first stage sidelink control information to at least two separate spatial layers of the sidelink control channel and mapping the second stage sidelink control information to at least two separate spatial layers of the three or more spatial layers of the sidelink shared channel based at least in part on the sidelink shared channel being mapped to the three or more spatial layers; and
transmit the sidelink control information based at least in part on the mapping.

19. The UE of claim 18, wherein the one or more processors are individually or collectively further operable to execute the code to cause the UE to:
repeat the first portion of the second stage sidelink control information across the first set of one or more spatial layers for transmission of the first data codeword; and
repeat the second portion of the second stage sidelink control information across the second set of one or more spatial layers for transmission of the second data codeword.

20. The UE of claim 18, wherein the one or more processors are individually or collectively further operable to execute the code to cause the UE to:
repeat the second stage sidelink control information across each spatial layer of the three or more spatial layers.

21. The UE of claim 18, wherein the one or more processors are individually or collectively further operable to execute the code to cause the UE to:
receive a radio resource control parameter; and
identify a spatial layer mapping configuration based at least in part on the radio resource control parameter, wherein the second stage sidelink control information is mapped to the three or more spatial layers based at least in part on the spatial layer mapping configuration.

22. The UE of claim 18, wherein the one or more processors are individually or collectively further operable to execute the code to cause the UE to:
identify a spatial layer mapping configuration; and
transmit an indication of the spatial layer mapping configuration in the first stage sidelink control information, wherein the second stage sidelink control information is mapped to the three or more spatial layers based at least in part on the spatial layer mapping configuration.

23. The UE of claim 18, wherein the one or more processors are individually or collectively further operable to execute the code to cause the UE to:
repeat the first stage sidelink control information across two spatial layers of the sidelink control channel.

24. The UE of claim 18, wherein the one or more processors are individually or collectively further operable to execute the code to cause the UE to:
map the first stage sidelink control information across the at least two separate spatial layers of the sidelink control channel.

25. A user equipment (UE) for wireless communication, comprising:
means for determining sidelink control information for sidelink communications, the sidelink control information including first stage sidelink control information for transmission in a sidelink control channel and second stage sidelink control information for transmission in a sidelink shared channel;
means for identifying that the sidelink shared channel is mapped to three or more spatial layers, the spatial layers being multiple-input and multiple-output (MIMO) layers;
means for identifying a first set of one or more spatial layers of the three or more spatial layers of the sidelink shared channel for transmission of a first data codeword;
means for identifying a second set of one or more spatial layers of the three or more spatial layers of the sidelink shared channel for transmission of a second data codeword, wherein the second stage sidelink control information comprises a first allocation associated with the first data codeword and a second allocation associated with the second data codeword, and wherein the first allocation associated with the first data codeword is different from the second allocation associated with the second data codeword and a portion of the first allocation is the same as a portion of the second allocation;
means for mapping the first stage sidelink control information to at least two separate spatial layers of the sidelink control channel and mapping the second stage sidelink control information to at least two separate spatial layers of the three or more spatial layers of the sidelink shared channel based at least in part on the sidelink shared channel being mapped to the three or more spatial layers; and
means for transmitting the sidelink control information based at least in part on the mapping.

26. A non-transitory computer-readable medium storing code for wireless communication at a user equipment (UE), the code comprising instructions executable by one or more processors individually or collectively to:
determine sidelink control information for sidelink communications, the sidelink control information including first stage sidelink control information for transmission in a sidelink control channel and second stage sidelink control information for transmission in a sidelink shared channel;
identify that the sidelink shared channel is mapped to three or more spatial layers, the spatial layers being multiple-input and multiple-output (MIMO) layers;
identify a first set of one or more spatial layers of the three or more spatial layers of the sidelink shared channel for transmission of a first data codeword;
identify a second set of one or more spatial layers of the three or more spatial layers of the sidelink shared channel for transmission of a second data codeword, wherein the second stage sidelink control information comprises a first allocation associated with the first data codeword and a second allocation associated with the second data codeword, and wherein the first allocation associated with the first data codeword is different from the second allocation associated with the second data codeword and a portion of the first allocation is the same as a portion of the second allocation;
map the first stage sidelink control information to at least two separate spatial layers of the sidelink control channel and mapping the second stage sidelink control information to at least two separate spatial layers of the three or more spatial layers of the sidelink shared channel based at least in part on the sidelink shared channel being mapped to the three or more spatial layers; and
transmit the sidelink control information based at least in part on the mapping.

* * * * *